US012633001B2

(12) United States Patent
Green et al.

(10) Patent No.: US 12,633,001 B2
(45) Date of Patent: May 19, 2026

(54) METHOD FOR DETECTING AND VISUALIZING OBJECTS WITHIN A SPACE

(71) Applicant: VergeSense, Inc., Mountain View, CA (US)

(72) Inventors: Kelby Green, Mountain View, CA (US); Kanav Dhir, Mountain View, CA (US)

(73) Assignee: VergeSense, Inc., San Francisco, CA (US)

( * ) Notice: Subject to any disclaimer, the term of this patent is extended or adjusted under 35 U.S.C. 154(b) by 226 days.

(21) Appl. No.: 18/367,388

(22) Filed: Sep. 12, 2023

(65) Prior Publication Data

US 2024/0070932 A1     Feb. 29, 2024

Related U.S. Application Data

(63) Continuation-in-part of application No. 18/134,490, filed on Apr. 13, 2023, now Pat. No. 12,307,770.

(60) Provisional application No. 63/405,811, filed on Sep. 12, 2022, provisional application No. 63/405,816, filed on Sep. 12, 2022, provisional application No. 63/330,642, filed on Apr. 13, 2022.

(51) Int. Cl.
| | |
|---|---|
| *G06T 11/00* | (2026.01) |
| *G06T 3/60* | (2006.01) |
| *G06T 7/73* | (2017.01) |
| *G06V 10/22* | (2022.01) |
| *G06V 10/25* | (2022.01) |
| *G06V 10/44* | (2022.01) |
| *G06V 20/52* | (2022.01) |
| *G06V 20/70* | (2022.01) |

(52) U.S. Cl.
CPC ............... *G06T 11/00* (2013.01); *G06T 3/60* (2013.01); *G06T 7/73* (2017.01); *G06V 10/22* (2022.01); *G06V 10/25* (2022.01); *G06V 10/44* (2022.01); *G06V 20/52* (2022.01); *G06V 20/70* (2022.01); *G06T 2207/30232* (2013.01)

(58) Field of Classification Search
CPC .................................. G06T 11/00; G06T 7/73
See application file for complete search history.

(56) References Cited

U.S. PATENT DOCUMENTS

| | | | |
|---|---|---|---|
| 2003/0030398 A1* | 2/2003 | Jacobs | ................. G05D 1/0274 318/568.12 |
| 2019/0318178 A1* | 10/2019 | Kauffmann | ............... G06T 7/55 |
| 2020/0304690 A1* | 9/2020 | Zweigle | ................. H04N 25/48 |

* cited by examiner

*Primary Examiner* — Yi Yang
(74) *Attorney, Agent, or Firm* — Run8 Patent Group, LLC; Peter Miller; Madison Tyrcha

(57) ABSTRACT

One variation of a method for detecting and visualizing objects within a space includes: retrieving a map of the space annotated with known locations of target anchor objects and regions in the space; accessing a set of images annotated with object types and locations of objects captured by a set of sensor blocks; projecting the set of images onto the map to form a visualization representing objects in the space based on known locations of the set of sensor blocks; isolating a target anchor object at a known location in a region of the visualization; detecting a mutable object at a location in the region; calculating an offset distance between the location and the known location; and, in response to the offset distance exceeding an offset distance threshold, highlighting the mutable object in the visualization as a deviation; and generating a notification to investigate the mutable object in the region.

18 Claims, 6 Drawing Sheets

METHOD FOR DETECTING AND VISUALIZING OBJECTS WITHIN A SPACE

CROSS-REFERENCE TO RELATED APPLICATIONS

This Application claims the benefit of U.S. Provisional Application No. 63/405,811, filed on 12 Sep. 2022, and 63/405,816, filed on 12 Sep. 2022, each of which is incorporated in its entirety by this reference.

This Application is a continuation-in-part of U.S. patent application Ser. No. 18/134,490 filed on 13 Apr. 2023, which claims the benefit of U.S. Provisional Application No. 63/330,642, filed on 13 Apr. 2022, each of which is incorporated in its entirety by this reference.

This Application is also related to U.S. patent application Ser. No. 16/828,676 filed on 24 Mar. 2020, which is incorporated in its entirety by this reference.

TECHNICAL FIELD

This invention relates generally to the field of workplace monitoring and more specifically to a new and useful method for detecting and visualizing objects within a space in the field of workplace monitoring.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
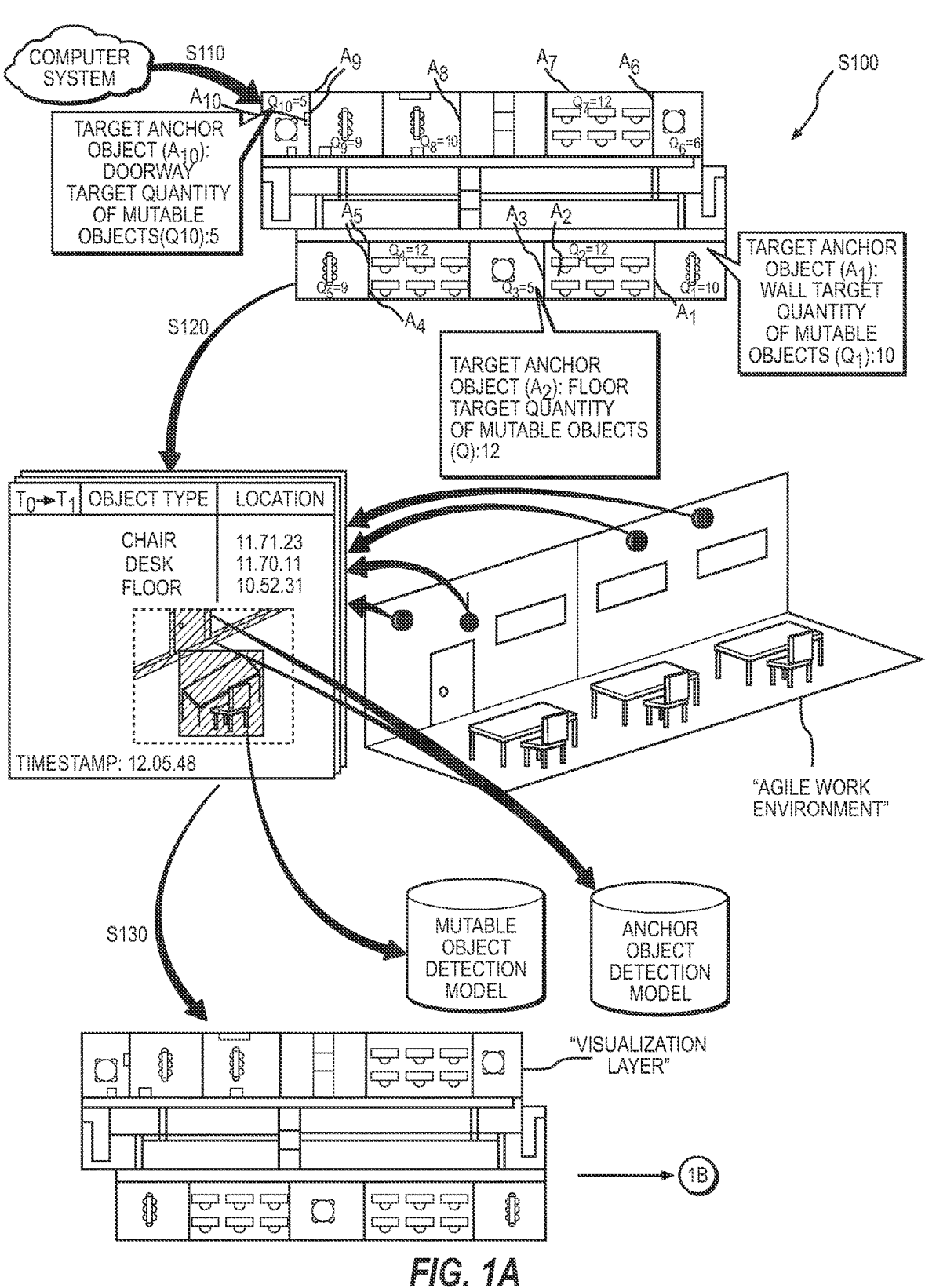
FIGS. 1A and 1B is a flowchart representation of a method.
Figure 1B:
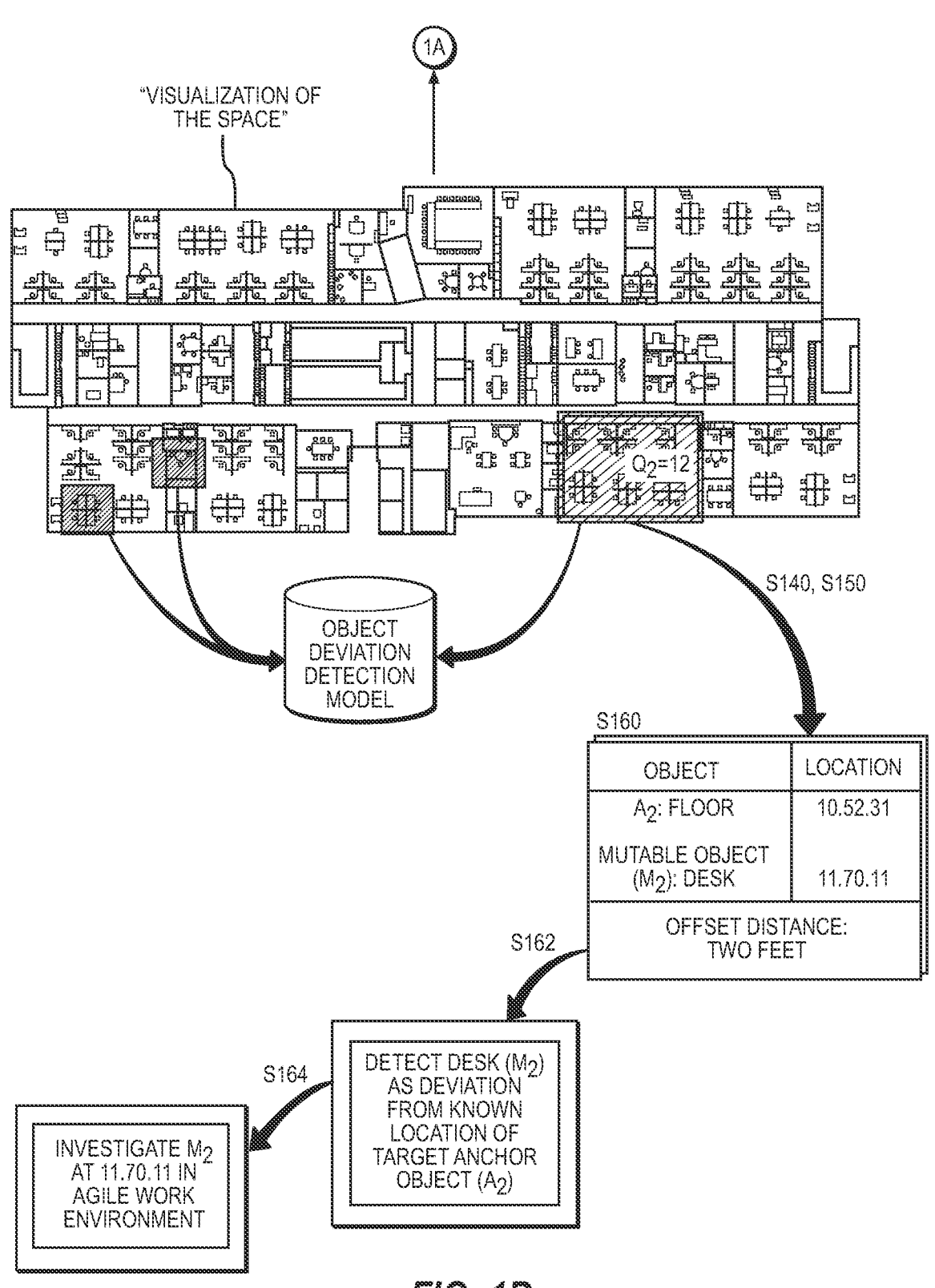

As shown in FIGS. 1A and 1B, a method S100 for detecting and visualizing objects within a space includes, during a first time period: retrieving a map of the space annotated with known locations of target anchor objects and regions in the space in Block S110; accessing a first set of images captured by a set of sensor blocks arranged within the space, the first set of images annotated with object types and locations of objects in Block S120; and projecting the first set of images onto the map to form a visualization layer representing objects in the space based on known locations of the set of sensor blocks in Block S130. The method S100 further includes, during a second time period: isolating a target anchor object at a known location in a first region of the visualization layer in Block S140; detecting a first mutable object, in a set of mutable objects, at a first location in the first region in Block S150; calculating an offset distance between the target anchor object and the first mutable object, in the set of mutable objects, based on the first location and based on the known location in Block S160; and, in response to the offset distance exceeding a threshold offset distance highlighting the first mutable object in the visualization layer as a deviation in Block S162 and generating a notification to investigate the first mutable object in the first region in Block S164.

1.1 Variation: Anchor Object Alignment+Duration Deviation

Figure 4:
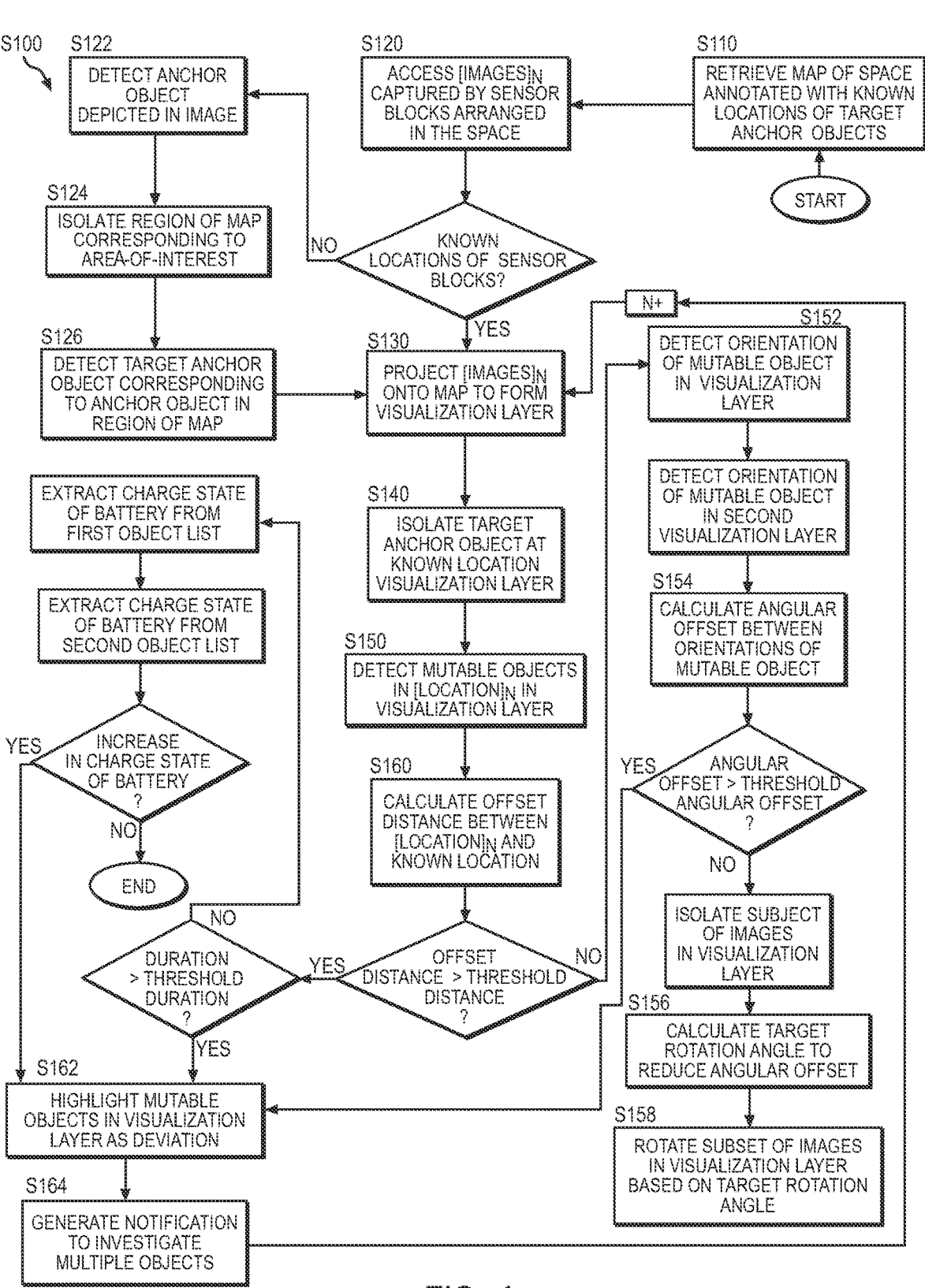
FIG. 4 is a flowchart representation of one variation of the method.

One variation of the method S100, shown in FIG. 4, includes, during a first time period: retrieving a map of the space annotated with known locations of target anchor objects in Block S110; accessing a first image captured by an optical sensor arranged within a sensor block and facing an area-of-interest in the space in Block S120; detecting a first anchor object depicted in the first image in Block S122; isolating a first region of the map corresponding to the area-of-interest in Block S124; detecting a target anchor object, corresponding to the first anchor object, in the first region of the map in Block S126; and, in response to detecting the target anchor object, corresponding to the first anchor object in the first region of the map, projecting the first image onto the map to form a visualization layer for the first region in Block S130.

This variation of the method S100 further includes, during a second time period: detecting a first mutable object, in a set of mutable objects, at a first location in the visualization layer for a duration in Block S150; calculating an offset distance between the first location of the first mutable object, in the set of mutable objects and a known location of the target anchor object in Block S160; in response to the duration exceeding a threshold deviation duration and in response to the offset distance exceeding a threshold deviation distance, highlighting the first mutable object at the first location in the visualization layer as a deviation from the known location of the target anchor object in Block S162; and generating a notification to investigate the first mutable object in Block S164.

1.2 Variation: Known Location of Sensor Blocks+Visualization

One variation of the method S100 includes: retrieving a map of the space annotated with known locations of target anchor objects and regions in the space in Block S110; accessing a first set of images captured by a set of sensor blocks arranged within the space, the first set of images annotated with object types and locations of objects in Block S120; projecting the first set of images onto the map to form a visualization representing objects in the space based on known locations of the set of sensor blocks in Block S130; isolating a target anchor object at a known location in a region of the visualization in Block S140; detecting a first mutable object, in a set of mutable objects, at a first location in the region in Block S150; calculating an offset distance between the target anchor object and the first mutable object, in the set of mutable objects, based on the first location and based on the known location in Block S160; in response to the offset distance exceeding an offset distance threshold, highlighting the first mutable object in the visualization as a deviation from the known location of the target anchor object in Block S162; and generating a notification to investigate the first mutable object in the first region in Block S164.

2. Applications

Generally, Blocks of the method S100 can be executed by a computer system and/or a local gateway in conjunction with a population of sensor blocks deployed throughout a space (e.g., an office, a commercial facility, a workspace, a retail setting): to detect and differentiate between static objects (or "anchor objects") and dynamic objects (or "mutable objects") located within the space; to repeatably and accurately flatten (e.g., skew, scale) images captured by these sensor blocks; to implement computer vision techniques (e.g., edge detection) to accurately superimpose these skewed and scaled images onto an existing digital two-dimensional or three-dimensional map (e.g., a floor plan and a furniture layout) of the space; and to generate a real-time visualization of the furniture layout and/or furniture usage of the space that is searchable for locations, orientations, and/or dimensions of objects, such as via a user portal.

The computer system can further populate the visualization with visualization layers each corresponding: to images captured by the population of sensor blocks during a period of time; and a selectable timeline slider. The computer system can thereby enable a user (e.g., an administrator, a manager, a facilities management worker) to achieve and maintain awareness of the furniture layout and/or furniture usage of the space during any current or past time period.

Additionally or alternatively, the population of sensor blocks can implement a wireless communication protocol—according to a unicast mode and/or a multicast mode—to broadcast reference signals, to receive these reference signals, and to record transmit and receive durations (e.g., time of arrival receipts) for these reference signals according to a query schedule and/or a response schedule. The computer system can then aggregate a unicast matrix (e.g., table, list, chart) of time of arrival receipts of responses to queries and/or a multicast matrix (e.g., table, list, chart) of time of arrival receipts of responses to queries from each sensor block and transform these time of arrival receipts into time-based distances between sensor blocks to generate a sensor block deployment arrangement. The computer system can solve an optimization function for a two-dimensional or three-dimensional sensor block map solution that will produce a minimum error between modeled Euclidean distances and corresponding time-based distances from the unicast and/or multicast modes for all sensor blocks that communicated during the setup period. The computer system can leverage this solution to generate an augmented two-dimensional or three-dimensional map of the space and implement methods and techniques described above to generate a real-time visualization of the furniture layout and/or furniture usage of the space.

The computer system can also implement regression, machine learning, and/or other techniques to develop (or "learn") models for object detection and differentiation of anchor objects (e.g., walls, floors, ceilings, stairwells, doorways, doorframes) and mutable objects (e.g., chairs, desks, tables, couches) within the space. The computer system can then deploy these models to sensor blocks arranged in the space. A sensor block arranged in the space can thus locally execute these models to locally detect and differentiate between anchor and mutable objects in an image captured by the sensor block and then selectively offload types, orientations, and locations of these objects to the gateway, such as: in addition to offloading the image to the gateway in order to reduce computational load at the computer system; or in place of offloading the image to the gateway in order to increase privacy and security of visual information within the space. The computer system can further detect mutable objects deviating from a target condition as a function of: time; distance; charge state of a battery arranged in each sensor block; angular offset; and/or quantity of objects.

Further, the computer system can implement regression, machine learning, and/or other techniques to develop (or "learn") models for object deviation detection based on patterns of deviations of mutable objects within the space and automatically generate notifications prompting the user to investigate such deviations of mutable objects. For example, the computer system can: highlight a mutable object in the real-time visualization as a deviation; generate a notification prompting the user to investigate the deviation of the mutable object and serve the real-time visualization with an investigation prompt to the user, such as once per day or in real-time in response to detecting deviations of mutable objects.

Accordingly, the computer system can: collect user feedback responsive to these notifications; and reinforce mutable and anchor object detection models, implemented by the sensor blocks to identify objects, and the object deviation detection model, implemented by the computer system, to annotate the real-time visualization of the space responsive to positive feedback from the user. Additionally or alternatively, responsive to negative feedback from the user, the computer system can retrain and/or update the object deviation detection model accordingly.

Therefore, Blocks of the method S100 can be executed by a computer system: to provide deeper insight into the furniture layout, furniture usage, and deviations of mutable objects within the space; to maintain personal privacy (e.g., for employees, customers) by capturing images when humans are not present within the field of view of each sensor block and only displaying mutable objects (e.g., chairs, desks, tables, couches) as well as anchor objects (e.g., walls, floors, ceilings, stairwells, doorways, doorframes) in the real-time visualization of the space; to automatically generate and serve notifications to the user prompting the user to investigate deviations of mutable objects in the space; and to automatically retrain models for object detection and object deviation detection.

The method S100 is described herein as executed by the computer system to detect, track, visualize, and manage objects within a space, such as an office or clinic. However, the computer system can similarly execute Blocks of the method S100 to detect, track, visualize, and manage objects within an industrial, educational, municipal, or other setting.

3. Sensor Block

A sensor block can include: an optical sensor defining a field of view; a motion sensor configured to detect motion in or near the field of view of the optical sensor; a processor configured to extract data from images recorded by the optical sensor; a wireless communication module configured to wirelessly transmit data extracted from images; a battery configured to power the optical sensor, the processor, and the wireless communication module over an extended duration of time (e.g., one year, five years); a compass and/or an accelerometer to measure an orientation of the sensor block; and an housing configured to contain the optical sensor, the motion sensor, the processor, the wireless communication module, the battery, and the compass and/or accelerometer and configured to mount to a surface within the field of view of the optical sensor intersecting a region of interest within the facility (e.g., a conference table within a conference room, a cluster of agile desks in an agile work environment).

The optical sensor can include: a color camera configured to record and output two-dimensional color images; and/or a depth camera configured to record and output two-dimensional depth images or three-dimensional point clouds.

However, the optical sensor can define any other type of optical sensor and can output visual or optical data in any other format.

The motion sensor can include a passive infrared sensor (or "PIR" sensor) that defines a field of view that overlaps the field of view of the optical sensor and that passively outputs a signal representing motion within (or near) the field of view of the optical sensor. Furthermore, the sensor block can transition from an inactive state to an active state responsive to an output from the motion sensor indicating motion in the field of view of the motion sensor; the sensor block can then trigger the optical sensor to record an image (e.g., a two-dimensional color image), which may capture a source of the motion detected by the motion sensor.

In one example, the motion sensor is coupled to a wake interrupt pin on the processor. However, the motion sensor can define any other type of motion sensor and can be coupled to the processor in any other way.

In one variation, the sensor block also includes: a distance sensor (e.g., a 1D infrared depth sensor); an ambient light sensor; a temperature sensor; an air quality or air pollution sensor; and/or a humidity sensor. However, the sensor block can include any other ambient sensor. In the active state, the sensor block can sample and record data from these sensors and can selectively transmit these data—paired with insights extracted from images recorded by the sensor block—to a local gateway. The sensor block can also include a solar cell or other energy harvester configured to recharge the battery.

The processor can locally execute Blocks of the method S100, to selectively wake responsive to an output of the motion sensor, to trigger the optical sensor to record an image, to write various insights extracted from the image, and to then queue the wireless communication module to broadcast these insights to a nearby gateway for distribution to the computer system when these insights exhibit certain target conditions or represent certain changes.

The optical sensor, motion sensor, battery, processor, and wireless communication module, etc. can be arranged within a single housing configured to install on a flat surface—such as by adhering or mechanically fastening to a wall or ceiling—with the field of view of the optical sensor facing outwardly from the flat surface and intersecting a region of interest within the facility.

However, this "standalone," "mobile" sensor block can define any other form and can mount to a surface in any other way.

3.1 Wired Power & Communications

In one variation, the sensor block additionally or alternatively includes a receptacle or plug configured to connect to an external power supply within the facility—such as a power-over-Ethernet cable—and sources power for the optical sensor, processor, etc. from this external power supply. In this variation, the sensor block can additionally or alternatively transmit data—extracted from images recorded by the sensor block—to the computer system via this wired connection (i.e., rather than wirelessly transmitting these data to a local gateway).

4. Local Gateway

The system can also include a local gateway: configured to receive data transmitted from sensor blocks nearby via wireless communication protocol or via a local ad hoc wireless network; and to pass these non-optical data to the computer system, such as over a computer network or long-range wireless communication protocol. For example, the gateway can be installed near and connected to a wall electrical outlet and can pass data received from a nearby sensor block to the computer system in (near) real-time.

Furthermore, multiple gateways can be installed throughout the facility and can interface with many sensor blocks installed nearby to collect data from these sensor blocks and to return these data to the computer system.

In one variation, a sensor block transmits an (raw or compressed) image—recorded by the optical sensor in the sensor block during a scan cycle executed by the sensor block while in an active state—to a nearby gateway, and the gateway executes the method S100 and techniques described below to extract insights from this image and to return these insights to the computer system (e.g., scans the raw or compressed image).

5. Sensor Block Output

Generally, each sensor block can generate non-optical data and optical data, annotate these data, and transmit these data to the computer system.

More specifically, for each sampling period (e.g., once per ten-minute interval, once per ten-second interval when the sensor block detects motion in its field of view) the sensor block can: capture a set of images within the field of view of the optical sensor arranged within the sensor block; generate an object list (e.g., map, table, image) of object types (e.g., mutable objects, dynamic objects, anchor objects, static objects) detected in the set of images, locations of these object types, and orientations of these object types. Furthermore, the sensor block can annotate the set of images with a corresponding object list, timestamp, and unique identifier (e.g., a UUID, MAC address, IP address, or other wireless address, etc.) pertaining to the sensor block and transmit the annotated set of images to the computer system, such as via a wired or wireless connection (e.g., via the local gateway) to be stored in a database.

In one variation, the sensor block can extract orientations of object types from the object list at the sensor block including: dimensions (e.g., length, width, height, magnitude, etc.) and angular positions (e.g., 35 degrees, 60 degrees, 90 degrees) relative reference positions (e.g., predefined locations) of object types depicted in an existing digital two-dimensional or three-dimensional floor plan, furniture layout, and/or map of the space provided by a user (e.g., manager, installer, or administrator affiliated with the facility), further described below.

6. Computer System

Generally, the computer system—such as a remote server—can receive non-optical and/or optical data from one or more gateways installed in the facility (or directly from sensor blocks) and an existing digital two-dimensional or three-dimensional map depicting the floor plan and/or furniture layout of the space.

More specifically, the computer system can manipulate these non-optical data and/or optical data to generate a visualization of objects (e.g., anchor objects, mutable objects) within the space, to selectively trigger a prompt for a user to update the furniture configuration (or "layout") of a particular area within the facility (e.g., chair configuration of a lounge, desk configuration within an agile work environment), and to execute actions (e.g., generate notifications) in response to detecting deviations (e.g., a location of a chair exceeding a threshold distance from a known initial location of the chair depicted in the existing two-dimensional or three-dimensional floor plan of the space) from a particular furniture layout of the space.

Furthermore, the computer system can reinforce and/or update: anchor and mutable object detection models; edge detection techniques; an augmented two-dimensional or three-dimensional floor plan of the space; and the skew and scale of optical data (e.g., set of images) associated with each sensor block deployed in the space. The computer system can also extract insights for the furniture usage and the furniture layout of the space, as described below.

6.1 Data Aggregation

In one variation, the computer system can collect an object list and a set of images, annotated with time stamps and a unique identifier (e.g., a UUID, MAC address, IP address, or other wireless address, etc.) for all sensor blocks deployed in the space over a period of time (e.g., one day, one week, one month). Then, the computer system can store the annotated object list for each sensor block in a database and store the set of images for each sensor block in another database for combination in the future.

Alternatively, the computer system can collect a set of images annotated with non-optical data from the object list (e.g., mutable objects, anchor objects, locations, orientations, dimensions) from each sensor block deployed in the space over a period of time (e.g., one day, one week, one month). The computer system can then store the set of images annotated with non-optical data from the object list for each sensor block in a database.

7. Installation: Setup Period

Generally, during installation, each sensor block is installed (or "deployed") within the space of the facility. A user (e.g., manager, installer, or administrator of the facility) can install each sensor block such that the field of view of the camera of the sensor block encompasses an area-of-interest (or "subspace") within the space (e.g., a conference room, a desk within an agile work environment, an office lounge etc.).

Furthermore, during a setup period, a user (e.g., manager, installer, or administrator of the facility) can provide an existing digital two-dimensional or three-dimensional floor plan of the space and manually define anchor objects (e.g. walls, floors, ceilings, stairwells, doorways, etc.) within the existing digital two-dimensional or three-dimensional floor plan of the space. The user (e.g., manager, installer, or administrator of the facility) can also provide a particular furniture layout for the space (e.g., desired furniture layout or furniture plan for the space), thereby manually defining mutable objects (e.g. chairs, desks, tables) located throughout the space and known characteristics (e.g., boundaries, locations, orientations, dimensions, angular positions) of each mutable object. The computer system can then combine the existing digital two-dimensional or three-dimensional floor plan of the space and the particular furniture layout to generate an augmented two-dimensional map of the space. Thus, the computer system can generate an augmented two-dimensional map of the space based on known anchor objects depicted in the existing digital two-dimensional or three-dimensional floor plan of the space and known mutable objects and characteristics manually defined in the particular furniture layout.

Alternatively, the computer system can: retrieve an existing digital two-dimensional or three-dimensional floor plan of the space including a particular furniture layout—without defined mutable objects and their characteristics—provided by the user; initiate object detection models, implemented by each sensor block deployed in the space, to learn anchor objects and mutable objects within the space; superimpose images captured by sensor blocks deployed in the space onto the existing digital two-dimensional or three-dimensional floor plan of the space; and generate a real-time composite image (or "visualization") representing furniture usage and/or the furniture layout of the space at the present time. Thus, the computer system can automatically generate a real-time visualization of furniture usage and/or the furniture layout of the space based on known anchor objects in the existing digital two-dimensional or three-dimensional floor plan of the space, known mutable objects depicted in the particular furniture layout, and/or informed by detection of anchor objects and mutable objects by each sensor block deployed in the space.

8. Manual Visualization

In one implementation, the computer system can implement computer vision and object detection techniques to learn common objects present within the space over time. In particular, the computer system can differentiate between anchor objects (e.g., walls, floors, ceilings, stairwells, doorways, doorframes, etc.) and mutable objects (e.g., chairs, desks, tables, couches) within the space to later inform the skew and scale of images, captured by each sensor block deployed within the space. The computer system can also implement computer vision techniques (e.g., edge detection) to segment images and to automate alignment (e.g., matching, snap fitting) of edges of anchor objects detected within the space with corresponding known edges of anchor objects depicted in the existing digital two-dimensional or three-dimensional floor plan of the space.

Alternatively, the computer system can leverage known locations of sensor blocks to align features of images with the existing digital two-dimensional or three-dimensional floor plan of the space and project these images onto the existing digital two-dimensional or three-dimensional floor plan of the space to form a visualization of the furniture layout of the space and/or furniture usage within the space.

Thus, the computer system can accurately and repeatably: skew and scale an image; align edges of anchor objects detected within images to corresponding known edges of anchor objects depicted in the existing digital two-dimensional or three-dimensional floor plan of the space; project (e.g., superimpose) these images onto the existing digital two-dimensional or three-dimensional floor plan of the space; and generate a real-time visualization of the furniture layout of the space and/or furniture usage within the space.

8.1 Object Detection Models: Anchor Objects+Mutable Objects

In one variation, the computer system can: detect common objects within the space over a period of time (e.g., one day, one week, one month); extract locations (e.g., (x, y) positions) and orientations of common objects repeating at a high frequency within the field of view of each sensor block deployed in the space; and derive object detection models based on these common locations of objects, as shown in FIG. 1A.

Further, the sensor block can implement methods and techniques described above: to detect a set of objects (e.g., a wall, a floor, a table and four chairs) within an image of a subspace (e.g., a table within a conference room), within the field of view of the sensor block; and to extract locations and orientations of each object in the set of objects (e.g., a wall, a floor, a table, and four chairs). Then, the computer system can: track the location of each object in the set of objects (e.g., a wall, a floor, a table, and four chairs) during a period of time (e.g., one day, one week, one month) over a set of images; track the frequency of each object in the set of objects present within the space during future time periods; track motion (e.g., velocity) of each object in the set of objects; derive a mutable object detection model to detect objects as mutable objects within each image based on high frequency objects with a velocity in the set of objects; derive an anchor object detection model to detect objects as anchor objects within each image based on high frequency objects without a velocity in the set of objects; and transmit the mutable object detection model and the anchor object detection model to all sensor blocks with a similar subspace within the field of view of the sensor block.

For example, during a setup period, the sensor block can capture a sequence of images. Then, for each image in the sequence of images, the sensor block can: extract a set of features from the image; detect a set of objects based on the set of features; derive a location and an orientation of each object in the set of objects based on the set of features; and annotate the image with a timestamp and a unique identifier associated with a corresponding sensor block, in the set of sensor blocks. The computer system can then: derive a frequency of a subset of objects, in the set of objects, present within the sequence of images; and, in response to the frequency of the subset of objects exceeding a threshold frequency and in response to detecting presence of velocity of the subset of objects, identify the subset of objects as mutable objects and derive a mutable object detection model based on the subset of objects. The computer system can transmit the mutable object detection model to all sensor blocks with a similar subspace within the field of view of the sensor block. Each sensor block can then capture a set of images by the optical sensor arranged in the sensor block and implement the mutable object detection model to identify mutable objects depicted in each image and annotate each image with locations and orientations of these mutable objects.

Additionally, during the setup period, the computer system can: derive a frequency of a next subset of objects, in the set of objects, occurring within the sequence of images; and, in response to the frequency of this subset of objects exceeding the threshold frequency and in response to detecting presence of velocity of this subset of objects, identify the subset of objects as anchor objects and derive an anchor object detection model based on this subset of objects. The computer system can transmit the anchor object detection model to all sensor blocks with a similar subspace within the field of view of the sensor block. Each sensor block can then capture a set of images by the optical sensor arranged in the sensor block and implement the anchor object detection model to identify anchor objects depicted in each image and annotate each image with locations and orientations of these anchor objects.

Therefore, the computer system can derive object detection models, implemented by sensor blocks deployed throughout the space, based on frequency of objects in images captured by the sensor blocks to differentiate between anchor objects (e.g., walls, floors, ceilings, stairwells, doorways, etc.) that exhibit absence of motion (e.g., null velocity) and mutable objects (e.g., chairs, desks, tables) that exhibit motion within various subspaces throughout the space.

8.1.1 Action: User Validation of Object Detection Models

In this implementation, the sensor block can detect a static object at a first time and later detect the object with a velocity or vice versa. The computer system can access an object list and images from the sensor block, identify an object detection anomaly of motion of the static object, and generate a notification requesting an action from a user, and reinforce, retrain and/or update the object detection models.

For example, the sensor block can detect an anchor object with a null velocity (e.g., no velocity, absence of velocity) during a first time period and detect the anchor object with a velocity during a second time period. Then, the computer system can identify this anchor object as anomalous and generate a notification alerting a user to investigate the anchor object anomaly and then retrain and/or update the anchor object detection model.

Similarly, the sensor block can detect a mutable object with a velocity during a first time period and detect the mutable object with a null velocity (e.g., no velocity, absence of velocity) during a second time period. Then, the computer system can identify this mutable object as anomalous and execute actions (e.g., generate notifications) to notify a user to investigate this mutable object anomaly. Responsive to the user's confirmation of the mutable object anomaly (e.g., positive feedback from the user), the computer system can reinforce the mutable object detection model. Alternatively, responsive to negative feedback from the user, the computer system can: trigger each sensor block in the population of sensor blocks to capture a set of images; access this set of images from each sensor block; and retrain the mutable object detection model based on the set of images from each sensor block and/or update the mutable object detection model accordingly.

Therefore, responsive to the user's indication that the object anomaly was present, the computer system can reinforce the mutable object detection model and/or the anchor object detection model and mute related notifications in the future. Alternatively, responsive to the user's indication that the object anomaly was absent, the computer system can access image data from the population of sensor blocks and retrain and/or update the mutable object detection model and/or the anchor object detection model based on these image data. The computer system can then transmit the updated mutable object detection model and/or the anchor object detection model to the population of sensor blocks to implement during future time periods.

8.1.2 Skew & Scale of Images

Once each sensor block executes the object detection models to differentiate between anchor objects and mutable objects and the user validates the object detection models, the sensor block can implement methods and techniques described above to annotate images with non-optical data from an object list (e.g., anchor objects, mutable objects, an unique identifier pertaining to the sensor block, a timestamp, locations of objects, orientations of objects), and transmit the annotated images to the computer system. The computer system can then skew and scale images accordingly, from each sensor block, to match the existing digital two-dimensional or three-dimensional floor plan of the space.

More specifically, the computer system can skew an image (e.g., apply a horizontal slant to the image, apply a vertical slant to the image) and scale the image (e.g., resizing the image by increasing the pixel information of the image, resizing the image by decreasing the pixel information of the image) to match the scale of the existing digital two-dimensional or three-dimensional floor plan. For example, the computer system can skew an image by applying a horizontal slant such that a mutable object (e.g., a desk) within the image matches the corresponding known location of this mutable object (e.g., a desk) on the existing digital two-dimensional or three-dimensional floor plan of the space. The computer system can then scale the image by decreasing the pixel information (e.g., 750 pixels by 1,000 pixels) to match the scale of the existing digital two-dimensional or three-dimensional floor plan of the space (e.g., 540 pixels by 360 pixels).

8.2 Edge Detection: Matching Edges of Anchor Objects

Then, the computer system can implement computer vision techniques (e.g., edge detection) to segment the images to align (e.g., match, snap fit) edges of anchor objects to corresponding known edges of these anchor objects depicted in the existing digital two-dimensional or three-dimensional floor plan of the space to project (e.g., super-impose) the images onto the map of the space.

In one variation, the computer system can: access an image, in a set of images, captured by an optical sensor arranged within a sensor block, in the population of sensor blocks, and facing an area-of-interest (e.g., a subspace) in the space; detect an anchor object depicted in the image; isolate a region of the map corresponding to the area-of-interest; detect a target anchor object, corresponding to this anchor object in the region of the map; and, in response to detecting the target anchor object, corresponding to this anchor object in the region of the map, project the image onto the map to form a visualization layer for the region. More specifically, the computer system can project the image onto the map to form the visualization layer for the region by: isolating a first edge of the anchor object in the image; aligning the edge of the anchor object with a corresponding edge of the target anchor object in the region of the map; and superimposing the image onto the map to form the visualization layer of the region.

Further, a sensor block can implement the object detection models to detect a set of anchor objects and a set of mutable objects (e.g., a desk and a chair) within an image captured by the sensor block. Then, the computer system can implement methods and techniques described above to skew and scale the image to match the set of anchor objects with corresponding known anchor objects depicted in the existing digital two-dimensional or three-dimensional floor plan of the space. In particular, the computer system can: align a first edge of a first wall in the set of anchor objects with a corresponding first edge of the first wall depicted in the existing digital two-dimensional or three-dimensional floor plan; align a second edge of the first wall in the set of anchor objects with a corresponding second edge of the first wall depicted in the existing digital two-dimensional or three-dimensional floor plan; and generate a "snap-fit" of the edges of the first wall with the corresponding known edges of the first wall depicted in the existing digital two-dimensional or three-dimensional floor plan of the space.

For example, the sensor block can implement the anchor object detection model to detect a first anchor object (e.g., a floor) and a second anchor object (e.g., a wall abutting the floor) in an image, in a set of images, captured by the sensor block during an image cycle. The sensor block can then implement the mutable object detection model to detect a set of mutable objects (e.g., a set of chairs) within the image. The sensor block can: repeat methods and techniques described above for each other image in the set of images captured during the image cycle to detect each other mutable object and populate an object list for this image cycle with the first anchor object (e.g., a floor), the second anchor object (e.g., a wall abutting the floor), the set of mutable objects (e.g., a set of chairs), and locations and orientations of these anchor objects and mutable objects; and offload this object list and the set of images to the computer system. The computer system can then: access the map of the space; isolate a region of the map corresponding to the area-of-interest; and detect the first target anchor object (e.g., a floor) and the second target anchor object corresponding to a target wall abutting a target floor in the region of the map. Then, in response to detecting the first target anchor object (e.g., a floor) and the second target anchor object corresponding to the target wall abutting the target floor in the region of the map, the computer system can: align a first edge of the wall with a corresponding edge of the target wall in the region of the map; align a second edge of the floor with a corresponding second edge of the target floor in the region of the map; and superimpose the image onto the map to form a visualization layer of the region.

The computer system can then repeat these methods and techniques for each other edge of each other anchor object in the set of anchor objects to achieve alignment between the skewed and scaled image and the existing digital two-dimensional or three-dimensional floor plan of the space. The computer system can further implement methods and techniques described below to project this set of images onto the existing digital two-dimensional or three-dimensional floor plan of the space to generate a visualization or a visualization layer representing the area-of-interest depicted in each image.

Alternatively, the computer system can leverage known locations of sensor blocks to align features of images with the map and project these images onto the map to form a visualization. The computer system can then implement methods and techniques described above to isolate a target anchor object in the visualization and detect mutable objects in the visualization layer, as further described below.

8.3 Superimposing Images+Visualization Display

Lastly, the computer system can superimpose images from a range of time periods—such that each sensor block captures an image or a set of images of mutable objects (e.g., chairs, desks, tables) and anchor objects (e.g., walls, floors, ceilings, stairwells, doorways, etc.)—onto the existing digital two-dimensional or three-dimensional floor plan of the space. The computer system can then generate a real-time visualization of the furniture layout and/or furniture usage patterns of the space.

Furthermore, each image superimposed onto the existing digital two-dimensional or three-dimensional floor plan of the space, can be searchable via a user portal for object type labels, locations, orientations, and dimensions. The computer system can also generate a selectable timeline slider—accessible by the user at the user portal—to timely review the furniture layout and/or furniture usage of the space during a past or current period of time within the range of time periods. In particular, the real-time visualization of the furniture layout and/or furniture usage patterns of the space can include superimposed images captured during a range of time periods (e.g., three hours, one day, one week, one month, one year, etc.) at each sensor block deployed throughout the space. The computer system can receive a selection from a user at the user portal to display a real-time visualization of a particular area-of-interest within the space for a past or current period of time.

For example, the computer system can receive a query to review, from a user at the user portal, defining a target time window (e.g., 9 AM to 12 PM) on a past day of the week (e.g., Wednesday) and a target area-of-interest (e.g., a conference room) within the space. The computer system can then: scan the visualization for a region corresponding to the target area-of-interest (e.g., a conference room); and detect correspondence between the target area-of-interest (e.g., a conference room) and a first region of a first visualization layer in the visualization. Then, in response to the target time window intersecting the time period associated with the first visualization layer and in response to detecting correspondence between the target area-of-interest (e.g., a conference room) and the first region of the first visualization layer, the computer system can render (e.g., present, serve) the first visualization layer from the past time period (e.g., 9 AM to 12 PM) on the past day of the week (e.g., Wednesday) within the user portal for review by the user.

Therefore, the computer system can generate a real-time visualization of the furniture layout and/or furniture usage patterns of the space that is searchable for object types, locations, orientations, and dimensions via the user portal. The real-time visualization of the furniture layout and/or furniture usage patterns of the space can further include a selectable timeline slider and, thereby, provide the user with an real-time visualization of the of the furniture layout and/or furniture usage patterns of the space during any current or past time period.

9. Absent Digital Floor Plan+Autonomous Ranging

In one implementation, when an existing digital two-dimensional or three-dimensional floor plan is absent, the population of sensor blocks can implement a unicast mode short-range wireless communication protocol to broadcast reference signals, to receive these reference signals, and to record transmit and receive durations (e.g., time of arrival receipts) for these reference signals according to a query schedule.

In another implementation, when an existing digital two-dimensional or three-dimensional floor plan is absent, the population of sensor blocks can implement a multicast mode wireless communication protocol to broadcast signals, to receive these signals, and to record query and receive durations (e.g., time of arrival receipts) for these signals according to a response schedule.

Furthermore, the computer system can aggregate a unicast matrix (e.g., table, list, chart) of time of arrival receipts of responses to queries and a multicast matrix (e.g., table, list, chart) of time of arrival receipts of responses to queries from each sensor block and transform these time of arrival receipts into time-based distances between sensor blocks to generate a sensor block deployment arrangement. The computer system can then solve an optimalization function for a two-dimensional or three-dimensional sensor block map solution that will produce a minimum distance error between modeled Euclidean distances and corresponding time-based distances from the unicast and multicast modes, signal strength, power, and/or external factors for all sensor blocks that communicated during the setup period. The computer system can leverage this solution to generate an augmented two-dimensional or three-dimensional map of the space based on the two-dimensional or three-dimensional sensor block map solution.

9.1 Unicast Mode: Non-Directional Autonomous Ranging

In one implementation, the population of sensor blocks can implement a short-range wireless communication protocol in a unicast mode to broadcast reference signals, to receive these reference signals, and to record transmit and receive durations (e.g., time of arrival receipts) for these reference signals according to a query schedule. The sensor blocks and/or the computer system can then transform these reference signals into time-based distances between sensor blocks.

Furthermore, the computer system can define a query schedule for a unicast mode in order of activation (e.g., a numerical order of the sensor blocks deployed in the space) for the population of sensor blocks to transmit a reference signal. In particular, the first transmit assignment of a reference signal for a first sensor block in the population of sensor blocks occurs when the first sensor block is installed and activated within the space and the nth transmit assignment in the unicast mode query schedule occurs when an nth sensor block is installed and activated within the space.

For example, the computer system can define a query schedule for a unicast mode and upload this query schedule to the population of sensor blocks in the space. At a start time for the query schedule, the first sensor block in the numerical order can transmit a reference signal to the second sensor block in the order, the second sensor block can return the signal to the first sensor block at approximately the start time, and then the first sensor block can record a first transmit duration (e.g., $t1,2$, transmit) and a first receive duration (e.g., $t1,2$, receive) for the reference signal. At a second time, the first sensor block can transmit a reference signal to the nth sensor block in the order, the nth sensor block can return the signal to the first sensor block at approximately the second time, and then the first sensor block can record an nth transmit duration (e.g., $t1,n$, transmit) and an nth receive duration (e.g., $t1,n$, receive) for the reference signal. Then, the first sensor block can offload all transmit and receive durations to the computer system and repeat this method and technique until no response is received at the first sensor block from an nth sensor block in the numerical order; and transfer the transmit origin of the reference signal to the second sensor block in the numerical order. The population of sensor blocks can implement the short-range wireless communication protocol according to the query schedule for each other sensor block in the population of sensor blocks until a query is transmitted and received from all sensor blocks deployed in the space and/or until no response is received from an nth sensor block in the numerical order.

Therefore, when an existing digital two-dimensional or three-dimensional floor plan is absent, the population of sensor blocks can implement a short-range wireless communication protocol in unicast mode to minimize the power consumption of each sensor block deployed throughout the space and to collect transmit and receive durations of signals between sensor blocks. The computer system can then transform these durations into time-based distances and calculate a sensor block deployment arrangement.

9.2 Multicast Mode: Multi-Directional Autonomous Ranging

In one implementation, the population of sensor blocks can implement a wireless communication protocol in a multicast mode to broadcast signals, to receive these signals, and to record query and receive durations (e.g., time of arrival receipts) for these signals according to a response schedule. The sensor blocks and/or the computer system can then transform these signals into distances between sensor blocks and collect orientations of each sensor block in the population of sensor blocks.

Furthermore, each sensor block in the space can send and receive signals—via a multi-directional or omni-directional antenna (e.g., 2 orthogonal antennas, 3 orthogonal antennas)—to each other sensor block deployed throughout the space that falls within range according to the wireless communication protocol. The computer system can define a response schedule for the multicast mode in order of activation (e.g., a numerical order of the sensor blocks deployed in the space) for response assignments (e.g., response time) for each sensor block in the population of sensor blocks. In particular, the first response assignment in the response schedule for a first sensor block in the population of sensor blocks occurs when the first sensor block is installed and activated within the space (e.g., response time for the first sensor block: duration of [query time+0.0 seconds]), the second response assignment for a second sensor block occurs with the second sensor block is installed and activated within the space (e.g., response time for the second sensor block: duration of [query time+0.1 seconds]), and the nth response assignment in the response schedule occurs when an nth sensor block is installed and activated within the space (e.g., response time for the nth sensor block: duration of [query time+0.1 seconds*n]).

For example, the computer system can define a response schedule for a multicast mode and upload this response schedule to the population of sensor blocks in the space. At a start time for the response schedule, the first sensor block can transmit a signal to all sensor blocks within range, the second sensor block can return the signal according to the response schedule (e.g., duration of [query time+0.1 seconds*2]), then the first sensor block can record a first query duration (e.g., t1,2, query) and a first receive duration (e.g., t1,2, receive), a third sensor block in the numerical order can return the signal according to the response schedule (e.g., duration of [query time+0.1 seconds*3]), then the first sensor block can record a second receive duration (e.g., t1,3, receive), and the nth sensor block in the numerical order can return the signal to the response schedule (e.g., duration of [query time+0.1 seconds*n]) and then the first sensor block can record an nth receive duration (e.g., t1,n, receive). Later, the first sensor block can detect absence of a response from a sensor block (e.g., nth sensor block) in the population of sensor blocks. Responsive to detecting absence of a response from the nth sensor block and responsive to a maximum delay duration from the nth sensor block transmit time expiring, the first sensor block can: identify the nth sensor block and all remaining sensor blocks in the numerical order as out of range; and terminate listening for responses. The first sensor block can then compile the query duration and receive durations into a matrix of time of arrival receipts; offload the matrix to the computer system; and transfer the query transmission of the signal to the second sensor block in the numerical order. The population of sensor blocks can implement the wireless communication protocol according to the response schedule for each other sensor block in the population of sensor blocks until a query is transmitted and received from all sensor blocks deployed in the space and/or until no response is received from an nth sensor block in the numerical order. The computer system can also refine the broadcast range within the wireless communication protocol to reach out-of-range sensor blocks.

Additionally, the computer system can collect orientations of the population of sensor blocks based on the multidirectional antennas of each sensor block. The computer system can then incorporate these orientations into an optimization function to solve for a precise sensor block deployment arrangement, further described below.

Therefore, when an existing digital two-dimensional or three-dimensional floor plan is absent, the population of sensor blocks can: execute a wireless communication protocol in multicast mode to minimize the power consumption of each sensor block deployed throughout the space and to collect query durations, receive durations, and orientations of each sensor block. The computer system can then identify sensor blocks outside of a broadcast range; update and/or refine the broadcast range for optimal ranging; and calculate a precise sensor block deployment arrangement.

9.3 Sensor Block Map Solution

Generally, the computer system can aggregate a unicast mode matrix (e.g., table, list, chart) of transmit and receive durations (e.g., time of arrival receipts) to queries from each sensor block and aggregate a multicast mode matrix (e.g., table, list, chart) of query and receive durations and transform these durations form the unicast mode and the multicast mode into time-based distances between sensor blocks to generate a sensor block deployment arrangement (or "two-dimensional or three-dimensional sensor block map solution").

In one variation, the computer system can solve an optimization function for a two-dimensional or three-dimensional sensor block map solution that will produce a predefined minimum error between modeled Euclidean distances and corresponding time-based distances from the unicast and multicast modes—such as between a first sensor block, a second sensor block, to an nth sensor block deployed throughout the space (e.g., all sensor blocks that communicated during the setup period). For example, the computer system can iterate on possible two-dimensional or three-dimensional sensor block map solutions until a predefined minimum distance error is calculated (e.g., ±0.2 meters, ±0.5 meters) and/or until the total error of the solution is less than a defined threshold error (e.g., 2.0% error, 5.0% error, 10% error).

In another variation, the computer system can approximate distances by transforming signal strength (e.g. received signal strength indicator), measured power, and external factors affecting signal strength (e.g., environmental factors, physical obstructions, wireless network interference etc.) between each sensor block in the population of sensor blocks deployed throughout the space. The computer system can then repeat the method and techniques described above to solve the optimization function for the two-dimensional or three-dimensional sensor block map solution between modeled Euclidean distances and the approximated distances based on signal strength.

In yet another variation, the computer system can repeat the method and techniques described above to solve the optimization function for the two-dimensional or three-dimensional sensor block map solution between modeled Euclidean distances, approximated distances based on signal strength, and time-based distances from the unicast and multicast modes. Furthermore, the computer system can leverage this two-dimensional or three-dimensional sensor block map solution and the orientation of each sensor block—collected during the multicast mode—to assemble an updated two-dimensional or three-dimensional sensor block map solution.

Thus, the population of sensor blocks can implement a wireless communication protocol in a unicast mode and/or multicast mode and the computer system can transform data from these modes to calculate a two-dimensional or three-dimensional sensor block map solution and generate a two-dimensional or three-dimensional augmented map of the space thereby minimizing error, power consumption, and the amount of time to generate an augmented two-dimensional or three-dimensional map of the space when an existing digital two-dimensional or three-dimensional floor plan of the space is absent.

9.4 Augmented Map+Superimposing Images

In one implementation, after generating the augmented two-dimensional or three-dimensional map of the space, the computer system can collect images from each sensor block depicting the space and/or an orientation of each sensor block, detect a set of like (e.g., analogous) features between images from each sensor block, and implement methods and techniques described above to superimpose these images from each sensor block onto the augmented two-dimensional or three-dimensional map of the space to generate an accurate, real-time composite image (or "visualization") of the furniture layout and/or furniture usage of the space.

For example, the computer system can detect a set of like features (e.g., anchor objects, mutable objects) in a first image from a first sensor block deployed in the space (e.g., an agile work environment), the set of like features including an anchor object (e.g., a wall) and implement methods and techniques described above to skew and scale the image to match the (x, y) locations and/or orientations of the corresponding sensor block depicted in the augmented two-dimensional or three-dimensional map of the space. Then, computer system can: detect the set of like features in a second image from a second sensor block deployed in the space (e.g., an agile work environment); align a first edge of the wall detected in the second image with a corresponding first edge of the wall depicted in the first image; and generate a "snap-fit" of the first edge of the wall in the second image with the corresponding first edges of the wall depicted in the first image superimposed onto the augmented two-dimensional or three-dimensional map of the space and with the corresponding (x, y) location and/or orientation of the second sensor block. The computer system can also detect a second set of like features in a third image from a third sensor block deployed in the space, the second set of like features including a second anchor object (e.g., a ceiling); align a first edge of the ceiling detected in the third image with a corresponding first edge of the ceiling depicted in the second image; and generate a "snap-fit" of the first edge of the ceiling in the third image with the corresponding first edge of the ceiling depicted in the second image superimposed onto the augmented two-dimensional or three-dimensional map of the space and with the corresponding (x, y) location and/or orientation of the third sensor block.

The computer system can repeatably implement these methods and techniques for each other image captured at each other sensor block deployed throughout the space to generate a real-time visualization of the furniture layout and/or furniture usage of the space. Thus, when an existing two-dimensional or three-dimensional map is absent, the computer system can skew and scale images, implement edge detection techniques, and superimpose images to construct the real-time visualization of the furniture layout and/or furniture usage of the space.

10. Deviations: Conditions+Actions

In one implementation, the sensor block can: implement the mutable object detection model to detect and track mutable objects (e.g., chairs, desks, tables) over a period of time (e.g., one day, one week, one month) within the space, as depicted in the real-time visualization. The computer system can then: detect a reference position (e.g., a (x, y) position, a location) of each mutable object; isolate a target anchor object (e.g., a floor, a wall, a doorway, a doorframe, a staircase) at a known location in the visualization; calculate an offset distance between the reference position (e.g., a (x, y) position, a location) of the mutable object and the known location of the target anchor object during a current period of time; derive object deviation detection models based on patterns of mutable objects deviating from a target condition; and generate notifications in response to detecting mutable objects deviating from a target condition.

Generally, the computer system can detect mutable objects deviating from a target condition, as a function of: distance (e.g., a location of a mutable object deviating from a known location of a target anchor object, an offset distance between a mutable object and a target anchor object exceeding a threshold offset distance); time (e.g., an offset distance between a mutable object and a target anchor object present for a duration exceeding a threshold duration); charge state of a battery arranged in a sensor block (e.g., a charge state of battery detected during a second time period deviating from a charge state of the battery detected during a first time period); angular offset (e.g., an angular offset of a mutable object between orientations of two visualization layers falling below a threshold angular offset or exceeding a threshold angular offset); and/or quantity of objects (e.g., a quantity of mutable objects present in a visualization layer less than or greater than a target quantity of mutable objects). The computer system can then highlight (e.g., flag) the mutable object as a deviation from the target condition in the visualization and execute actions (e.g., generate notifications, generate prompts, generate recommendations) based on the target condition. The computer system can then detect patterns of mutable objects deviating from target conditions over time to develop or learn object deviation detection models.

More specifically, detecting mutable objects deviating from a target condition as a function of time can include detecting chairs located adjacent walls of a conference room instead of located adjacent a conference table as depicted in the map and occurring for a duration (e.g., eight days) exceeding a predefined threshold duration (e.g., one week, seven days). Detecting mutable objects deviating from a target condition as a function of distance can include detecting an offset distance (e.g., six feet) between a location of a chair depicted in the real-time visualization and a corresponding known location of a target anchor object (e.g., a floor) exceeding a threshold offset distance (e.g., four feet). For example, the computer system can: isolate a region of the map corresponding to an agile work environment in the space; detect a floor as an anchor object in an image captured by a sensor block; detect a chair as a mutable object at a location in the visualization layer for a duration; calculate an offset distance (e.g., six feet) between the location of the chair and the known location of the floor; and, in response to the offset distance (e.g., six feet) exceeding the threshold offset distance (e.g., four feet), highlight the chair in the visualization layer as a deviation from the known location of the target anchor object and generate a notification indicating the chair deviating from the known location of the target anchor object in the agile work environment.

Further, detecting mutable objects deviating from a target condition as a function of object quantity includes detecting a quantity of mutable objects within a threshold distance of a target anchor object and in response to the quantity of mutable objects falling below a target quantity of mutable objects defined in the map, the computer system can highlight a set of mutable objects in the visualization layer as deviating from the target quantity of mutable objects and generate a recommendation to increase the quantity of mutable objects to the target quantity. Alternatively, in response to the quantity of mutable objects falling exceeding the target quantity of mutable objects defined in the map, the computer system can highlight the set of mutable objects in the visualization layer as deviating from the target quantity of mutable objects and generate a recommendation to reduce the quantity of mutable objects to the target quantity. Detecting mutable objects deviating from a target condition as a function of time and distance can include detecting an offset distance (e.g., six feet) between a location of a chair depicted in the real-time visualization and a corresponding known location of a target anchor object (e.g., a floor) and tracking the offset distance occurring for a duration (e.g., twelve hours). Then, in response to the offset distance (e.g., six feet) exceeding a threshold offset distance (e.g., four feet) and in response to the duration exceeding a threshold duration (e.g., eight hours), the computer system can detect the chair as a furniture layout deviation from the floor, as further described below.

10.1 Condition: Offset Distance Deviation Detection

In one variation, the computer system can detect mutable objects deviating from a target condition as a function of distance. Further, the computer system can detect an offset distance between a location of a mutable object depicted in the real-time visualization and a known location of a target anchor object. Responsive to the offset distance exceeding a threshold offset distance, the computer system can highlight the mutable object in the location in the visualization as a deviation from the known location of the target anchor object, as shown in FIGS. 1A and 1B.

For example, the computer system can: detect a set of mutable objects (e.g., a table, and ten chairs) in a conference room during a period of time (e.g., one week); calculate a reference position of each mutable object in the set of mutable objects; detect an offset distance between a first mutable object (e.g., a chair) in the conference room as depicted in the visualization and the corresponding known reference position of the first mutable object depicted in the particular furniture layout; and generate a notification for a user to investigate the deviation of the first mutable object (e.g., a chair) detected in the conference room. Then, responsive to the user's indication that the deviation of the first mutable object (e.g., a chair) was present and a deviation from the particular furniture layout, the computer system can: track the frequency of the deviation of the first mutable object (e.g., a chair) during a second period of time (e.g., one week); define a pattern based on the frequency of the deviation of the first mutable object (e.g., a chair) detected during the second time period; and generate an object deviation detection model based on the pattern of the deviation of the first mutable object (e.g., a chair) for the conference room.

Therefore, the computer system can derive object deviation detection models based on patterns of deviations of mutable objects within the space.

10.2 Condition: Object Quantity Deviation Detection

Figure 3A:
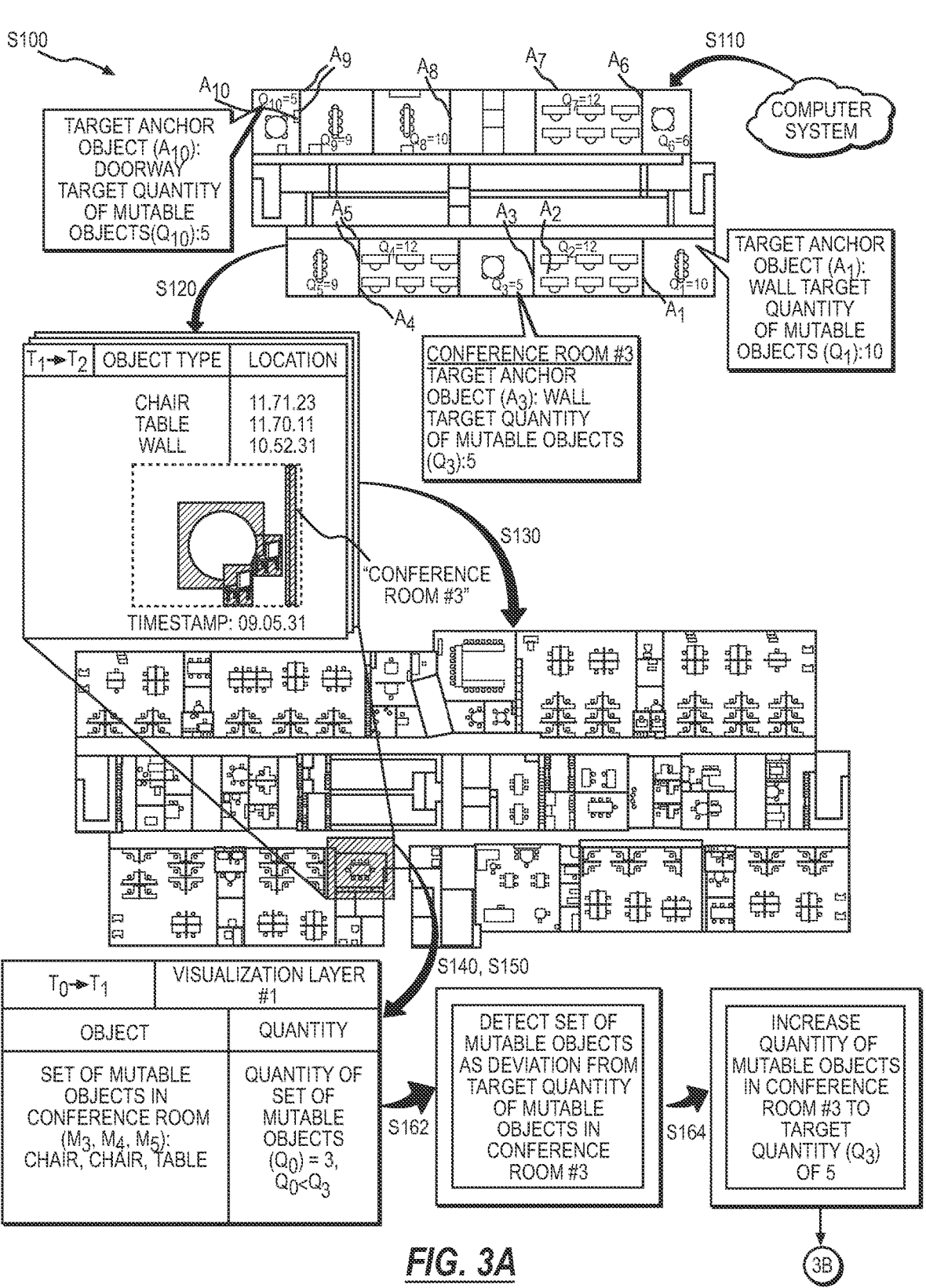
FIGS. 3A and 3B is a flowchart representation of one variation of the method.
Figure 3B:
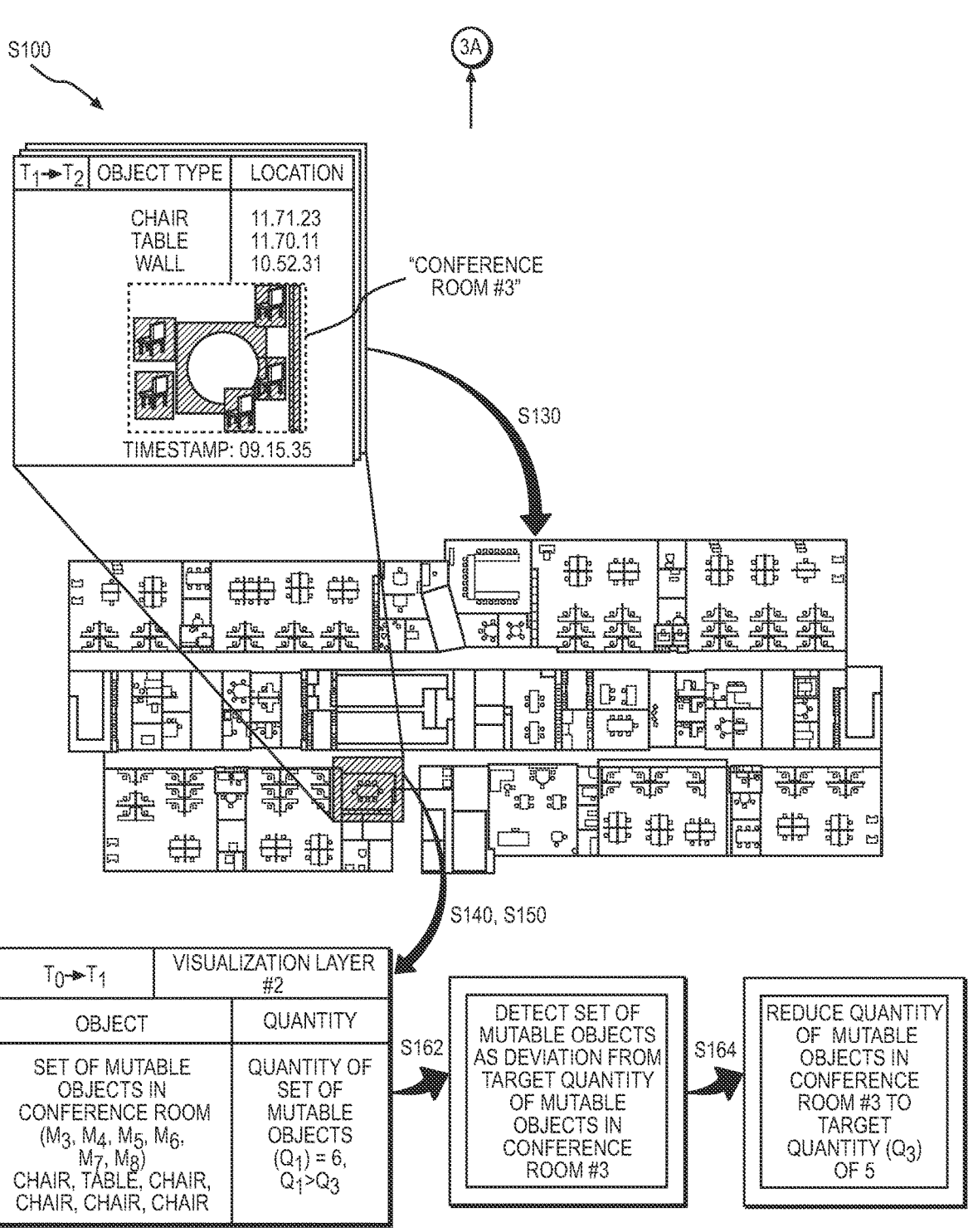

In one variation, the computer system can detect a set of mutable objects within a threshold distance of a known location of a target anchor object in the visualization. The computer system can then detect the set of mutable objects that exhibit a quantity less than and/or greater than a target quantity of mutable objects defined in the map of the space and highlight (e.g., flag) the set of mutable objects in the visualization as a deviation from the target quantity of mutable objects, as shown in FIGS. 3A and 3B.

Further, the computer system can: retrieve a map of the space including a floor plan of the space annotated with known locations of target anchor objects and regions in the space and a furniture layout of the space annotated with target quantities of mutable objects. The computer system can execute Blocks of the method S100 to: access images from the population of sensor blocks; align these images onto the map of the space; and project these images onto the map to form a visualization layer or a visualization representing objects in the space. The computer system can then: isolate a target anchor object at a known location in a region of the visualization layer in Block S140; detect a set of mutable objects within a threshold distance of the known location of the target anchor object in this region of the visualization layer; and characterize a quantity of mutable objects in this region. Then, in response to the quantity of mutable objects falling below a target quantity of mutable objects associated with the region (e.g., defined in the furniture layout within the map of the space), the computer system can: highlight the set of mutable objects, proximal a location, in the visualization layer as a deviation from the target quantity of mutable objects; generate a recommendation to increase the quantity of mutable objects to the target quantity of mutable objects in the location; and transmit the recommendation to a user (e.g., a manager or administrator affiliated with the space).

Alternatively, in response to the quantity of mutable objects exceeding the target quantity of mutable objects associated with the region, the computer system can highlight the set of mutable objects, proximal a location, in the visualization layer as a deviation from the target quantity of mutable objects; generate a recommendation to reduce the quantity of mutable objects to the target quantity of mutable objects in the location; and transmit the recommendation to the user.

For example, during a first time period, the computer system can: isolate a target doorframe at a known location in a region of the visualization layer representing a conference room; detect a set of (e.g., five) chairs and a set of (e.g., two) tables within a threshold distance (e.g., seven feet) of the known location of the target doorframe in this region of the visualization layer; and characterize a quantity of mutable objects in this region (e.g., seven). Then, in response to the quantity of mutable objects (e.g., seven mutable objects) falling below a target quantity of mutable objects associated with the region (e.g., ten mutable objects), the computer system can: highlight the set of (e.g., five) chairs and the set of (e.g., two) tables, proximal a location, in the visualization layer as a furniture layout deviation; generate a recommendation to increase the quantity of chairs (e.g., five chairs) present in this location in order to achieve the target quantity of mutable objects (e.g., ten mutable objects) for the conference room; and transmit the recommendation to a manager of the space.

During a second time period, the computer system can: isolate the target doorframe in the known location in the visualization layer representing the conference room; detect a set of (e.g., ten) chairs and a set of (e.g., two) tables within a threshold distance (e.g., seven feet) of the known location of the target doorframe in this region of the visualization layer; and characterize a quantity of mutable objects in this region (e.g., twelve). Then, in response to the quantity of mutable objects (e.g., twelve mutable objects) exceeding the target quantity of mutable objects associated with the region (e.g., ten mutable objects), the computer system can: highlight the set of (e.g., ten) chairs and the set of (e.g., two) tables, proximal a location, in the visualization layer as a furniture layout deviation from the target quantity of chairs; generate a recommendation to reduce the quantity of chairs (e.g., ten chairs) present in the location in order to achieve the target quantity of mutable objects (e.g., ten mutable objects) for the conference room; and transmit the recommendation to the manager of the space. The computer system can track this set of mutable objects in the conference room during future time periods to detect patterns of furniture layout deviations of mutable objects within the space and leverage these patterns to derive object deviation detection models.

Therefore, the computer system can characterize a quantity of mutable objects detected within a region of the visualization layer and leverage a target quantity of mutable objects defined for this region to detect a quantity of mutable objects deviating from a target quantity of mutable objects. The computer system can further execute actions (e.g., generate notifications) to indicate these deviations and provide a recommendation (e.g., reduce quantity of mutable objects in the region, increase quantity of mutable objects in the region) to a user and, thereby, enable the user to review a corresponding area-of-interest in the space in "real-time" to quickly address a quantity of mutable objects deviating from a target quantity of mutable objects.

10.3 Condition: Sensor Block Misalignment Deviation Detection

In one variation, the computer system can extract a charge state of a battery, arranged within a sensor block, from an object list generated by the sensor block during a first time period. The computer system can then extract a charge state of the battery (e.g., a voltage value, a percentage of voltage) from a next object list generated by the sensor block during a second time period and in response to detecting an increase in the charge state of the battery between the first time period and the second time period, detect the charge state of the battery of the second time period deviating from the first time period (e.g., a sensor block misalignment deviation, a battery replacement deviation), as shown in FIG. 4.

In one implementation, during a current time period (e.g., ten minutes, one hour, one day), the computer system can access an initial object list from a sensor block, in the population of sensor blocks, the initial object list defining locations, object types, and orientations of objects detected in an initial set of images captured by the sensor block during the current time period and an initial charge state of a battery arranged within the sensor block. Then, during a next time period, the computer system can access a next object list from the sensor block this object list defining locations, object types, and orientations of objects detected in a second set of images captured by the sensor block during this time period and a first charge state of the battery arranged within the sensor block. Then, in response to the first charge state of the battery exceeding the initial charge state of the battery, the computer system can: detect the first charge state of the battery as a deviation from the initial charge state of the battery; and generate a command for the sensor block to capture a third set of images. The computer system can then implement methods and techniques described above to: access this third set of images captured by the sensor block depicting a region of the space (e.g., an agile work environment, a conference room, a lounge area, a reception area, a hallway, a cafeteria); and project these images onto the map to form the visualization layer representing objects in this region of the space based on a known location of the sensor block.

For example, during a current time period (e.g., ten minutes during a work period), the sensor block can: capture an initial set of images depicting an agile work environment in the space; implement the object detection models to detect objects within the initial set of images; derive a location and an orientation of each object detected in the initial set of images; detect an initial charge state of a battery arranged in the sensor block (e.g., 1.2 Volts); and generate an initial object list annotated with locations, orientations, and object types of objects detected during the current time period and the initial charge state of the battery (e.g., 1.2 Volts). At the end of the work period (e.g., 7 PM), a user (e.g., a facilities management worker, a manager, an administrator) may wish to replace the battery in the sensor block. The user may then: remove the sensor block from a surface (e.g., a wall, a ceiling, a column); remove and replace the battery within the sensor block; and locate the sensor block onto the surface such that the agile work environment intersects the field of view of the optical sensor arranged in the sensor block.

During a next time period (e.g., ten minutes during a following work period), the sensor block can: capture a first set of images depicting the agile work environment in the space; implement the object detection models to detect objects within the first set of images; derive a location and an orientation of each object detected in the first set of images; detect a first charge state of the battery arranged in the sensor block (e.g., 3.0 Volts); and generate a first object list annotated with locations, orientations, and object types of objects detected during this period and the first charge state of the battery (e.g., 3.0 Volts). The computer system can then: access the initial object list from the sensor block generated during the first work period; extract the initial charge state of the battery (e.g., 1.2 Volts) from the initial object list; access the first object list from the sensor block generated during the following work period; and extract the first charge state of the battery (e.g., 3.0 Volts) from the first object list. Then, in response to the first charge state of the battery (e.g., 3.0 Volts) exceeding the initial charge state of the battery (e.g., 1.2 Volts), the computer system can: identify a replacement of the battery arranged in the sensor block between the first work period and the following work period; detect the first charge state of the battery as a deviation from the initial charge state of the battery (e.g., a sensor block misalignment deviation); and automatically generate a command for the sensor block to capture a second set of images.

The computer system can then implement methods and techniques described above to: access the second set of images captured by the sensor block depicting the agile work environment and project these images onto a region of the map representing this agile work environment to form the visualization layer based on a known location of the sensor block within the space.

Therefore, the computer system can extract a charge state of the battery arranged within the sensor block between two time periods to identify a replacement of the battery in the sensor block and detect a deviation between charge states of the battery.

10.4 Condition: Angular Offset Deviation Detection

Figure 2:
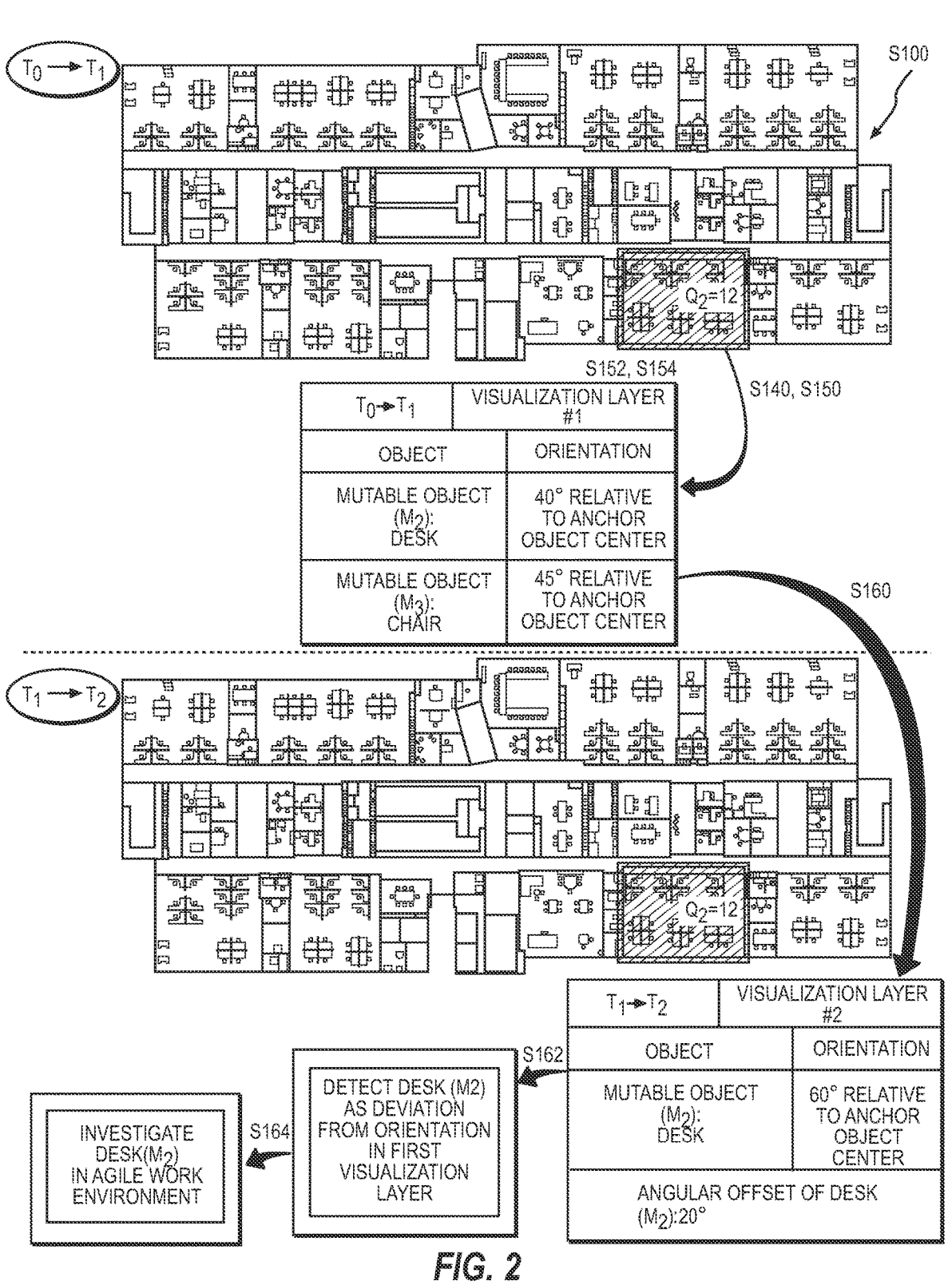
FIG. 2 is a flowchart representation of one variation of the method.

In one variation, the computer system can implement methods and techniques described above to project images onto the map to form a first visualization layer for a first time period and a second visualization layer for a second time period. The computer system can further detect a mutable object at an orientation within the threshold distance of a target anchor object in the first visualization layer and the second visualization layer. The computer system can then detect an angular offset between the orientation of the mutable object in the first layer and the second layer, and responsive to the angular offset exceeding a threshold angular offset (e.g., defined by the computer system over a period of time, defined by a user), detect the mutable object in the second visualization layer as a deviation from the orientation in the first visualization layer, as shown in FIGS. 2 and 4.

In one implementation, during a first time period (e.g., 8 AM to 9 AM) the computer system can project the first set of images onto the map to form a first visualization layer representing objects in the space based on known locations of the set of sensor blocks. Then, during a next time period, (e.g., 9 AM to 10 AM), the computer system can: access a second set of images—captured by the population of sensor blocks deployed throughout the space—annotated with object types, orientations, and locations of objects detected during this time period; and project the second set of images onto the map to form a second visualization layer of objects in the space based on known locations of the population of sensor blocks.

Additionally, the computer system can: isolate a target anchor object at a known location in a first region of the first visualization layer and the second visualization layer; detect a mutable object at a first orientation and within a threshold distance of the target anchor object in the first region of the first visualization layer; detect the mutable object at a second orientation and within the threshold distance of the target anchor object in the first region of the second visualization layer; and calculate an angular offset between the mutable object in the first visualization layer and the second visualization layer based on the first orientation and the second orientation. Then, in response to the angular offset exceeding a threshold angular offset, the computer system can: highlight the mutable object, proximal a location in the second visualization layer, as a deviation from the first orientation in the first visualization layer; generate a notification to investigate the mutable object in the location; and transmit the notification to the user.

For example, a set of workers affiliated with the space may prefer a couch within a lounge area at a specific orientation to face a table in the lounge area and enable interaction with workers at the table during a break period in a workday. The set of workers may then rotate the couch from a first orientation to a second orientation at the beginning of the break period and rotate the couch from the second orientation to the first orientation upon termination of the break period. Further, the computer system can: isolate a wall as the target anchor object at a known location in the first region, representing the lounge area, in the second visualization layer; detect a couch as the mutable object at a first orientation and within a threshold distance of the wall in the lounge area of the first visualization layer; detect the couch at a second orientation and within the threshold distance of the wall in the lounge area in the second visualization layer; and calculate an angular offset between the couch in the first visualization layer and the second visualization layer. Then, in response to the angular offset exceeding a threshold angular offset, the computer system can: highlight the couch in the second visualization layer as a furniture layout deviation from the first orientation of the couch in the first visualization layer; generate a notification to investigate the couch in the lounge area; and transmit the notification to the user.

Further, the computer system can: receive a query from a user at the user portal defining a target time window and a target area-of-interest within the space to review; detect correspondence between the target area-of-interest and the first region in the visualization (e.g., the lounge area); and, in response to the target time window intersecting the time period associated with the second visualization layer and in response to detecting correspondence between the target area-of-interest and the first region in the visualization, render (e.g., serve, present) the second visualization layer in the user portal for review by the user.

Alternatively, in response to the angular offset falling below the threshold angular offset, the computer system can: isolate a subset of images, in the second set of images, within the first region of the second visualization layer; calculate a target rotation angle for the subset of images to reduce the angular offset between the first orientation and the second orientation of the couch in the lounge area; and rotate the subset of images within the first region of the second visualization layer based on the target rotation angle.

Therefore, the computer system can track the orientation of a mutable object within a region of multiple visualization layers over time to detect angular offsets of the mutable object and leverage these angular offsets to detect a furniture layout deviation of the mutable object between these visualization layers and/or to rotate images within a visualization layer to align with the orientation of an initial visualization layer.

10.4.1 Variation: Angular Offset+Sensor Block Misalignment Deviation Detection

In one variation, the computer system can detect an increase between a first charge state of a battery in the sensor block and a second charge state of the battery over a period of time (e.g., ten hours, one day, one week) and detect the second charge state of the battery as a deviation from the first charge state of the battery (e.g., a sensor block misalignment deviation). The computer system can further detect an angular offset between an orientation of a mutable object, detected by the sensor block, in a first visualization layer corresponding to the first charge state of the battery and a second visualization layer corresponding to the second charge state of the battery. Responsive to the angular offset exceeding a threshold angular offset, the computer system can confirm the second charge state of the battery as a deviation from the first charge state of the battery.

Further, the computer system can implement methods and techniques described above to: access an initial object list from a sensor block generated during a first work period; extract an initial charge state of the battery (e.g., 1.2 Volts) from the initial object list; access a first object list from the sensor block generated during a following work period; and extract a first charge state of the battery (e.g., 3.0 Volts) from the first object list. Then, in response to the first charge state of the battery (e.g., 3.0 Volts) exceeding the initial charge state of the battery (e.g., 1.2 Volts), the computer system can: identify a replacement of the battery arranged in the sensor block between the first work period and the following work period; and predict the first charge state of the battery as a deviation from the initial charge state of the battery (e.g., a sensor block misalignment deviation). The computer system can then implement methods and techniques described above to: isolate a target anchor object at a known location in a first region of a first visualization layer representing objects within the space during the first work period and a second visualization layer representing object within the space during the following work period; detect a mutable object at a first orientation and within a threshold distance of the target anchor object in the first region of the first visualization layer; detect the mutable object at a second orientation and within the threshold distance of the target anchor object in the first region of the second visualization layer; and calculate an angular offset between the mutable object in the first visualization layer and the second visualization layer based on the first orientation and the second orientation. Then, in response to the angular offset exceeding a threshold angular offset, the computer system can: confirm the first charge state of the battery as a deviation from the initial charge state of the battery; and automatically generate a command for the sensor block to capture a new set of images.

The computer system can then: highlight the mutable object, proximal a location, in the second visualization layer as a deviation from the first orientation in the first visualization layer; generate a notification to investigate the mutable object in the location; and transmit the notification to the user. Further, the computer system can: generate a command for the sensor block to capture a new set of images; access the new set of images from the sensor block; and execute Blocks of the method S100 to project the new set of images onto the map of the space to generate a new visualization layer for the time period corresponding to the first charge state of the battery (e.g., 3.0 Volts) detected during the following work period.

Alternatively, in response to the angular offset falling below the threshold angular offset (e.g., a maximum angular offset) and exceeding a minimum angular offset, the computer system can: identify the first charge state of the battery as a deviation from the initial charge state of the battery as a furniture layout deviation from the first orientation in the first visualization layer; highlight the mutable object, proximal a location in the second visualization layer, as a furniture layout deviation from the first orientation in the first visualization layer; generate a notification to investigate the mutable object in the location; and transmit the notification to the user.

Therefore, the computer system can track the charge state of the battery in the sensor block over time to predict the first charge state of the battery as a deviation from the initial charge state of the battery and then leverage an angular offset between orientations of a mutable object visualization layers, corresponding to a time of detection of a charge state of the battery, to confirm the first charge state of the battery as a deviation from the initial charge state of the battery and/or detect the mutable object as a furniture layout deviation between visualization layers.

10.5 Action: Deviation Response+User Validation of Deviation

In this implementation, responsive to detecting deviations of mutable objects, the computer system can execute actions (e.g., generate notifications) to notify a user to investigate deviations of mutable objects and then reinforce or retrain and/or update the object deviation detection model.

Accordingly, responsive to the user's indication that the deviation of a mutable object was present and a deviation from the particular furniture layout, the computer system can reinforce the object deviation detection model.

Similarly, responsive to the user's indication that the deviation of a mutable object was absent and not a deviation from the particular furniture layout, the computer system can retrain and/or update the object deviation detection model and mute related notifications in the future.

10.6 Example: Desk Deviation in Agile Work Environment

In an example implementation, the computer system can implement Blocks of the method S100 to generate a real-time visualization of the furniture layout and/or furniture usage patterns of the space. Then, the computer system can detect deviations of mutable objects in the visualization according to a threshold deviation distance in relation to mutable objects of the map (e.g., a particular furniture layout) labeled with locations and orientations, provided by the user (e.g., manager, installer, or administrator affiliated with the space). Furthermore, the computer system can detect locations of mutable objects deviating from known locations of anchor objects as a function of distance and time.

In particular, the computer system can detect locations of a set of mutable objects (e.g., chairs, desks, tables) deviating from a known location of a target anchor object in the visualization based on a predefined distance threshold, manually defined by the user (e.g., manager, installer, or administrator affiliated with the space). In response to the duration of the locations of the set of mutable objects deviating from the known location of the target anchor object exceeding a duration threshold (e.g., defined by the user), the computer system can: detect the set of mutable objects as a deviation from the known location of the target anchor object; and generate a notification to investigate the set of mutable objects.

For example, the computer system can receive a minimum distance threshold and a maximum distance threshold between each mutable object (e.g., chair, desk, table) and a target anchor object such as a wall within an agile work environment. The computer system can isolate the wall at a known location in a region representing the agile work environment in the visualization layer; calculate a reference position of each mutable object depicted in the visualization layer; and implement the object deviation detection model. The computer system can then: detect a first desk, in a set of desks, at a first location in the agile work environment; and calculate an offset distance (e.g., two feet) between the wall and the first desk, in the set of desks, based on the first location and the known location.

Then, in response to the offset distance (e.g., two feet) exceeding the minimum distance threshold (e.g., one foot) between the first desk and the wall, the computer system can: highlight the desk, proximal a first location in the visualization layer, as a deviation from the known location of the wall; generate a notification to investigate the desk in the first location of the agile work environment; generate a prompt for the user to identify the desk as a deviation from the known location of the wall as present or absent within the space; and transmit the visualization of the space, the notification, and the prompt to the user. Responsive to the user's indication of absence of the desk deviating from the known location of the wall and absence of the desk deviating from the map (e.g., furniture layout of the space), the computer system can retrain and update the object deviation detection model and continue to track the desk during future time periods.

Later, responsive to a second offset distance (e.g., six feet) exceeding a maximum distance threshold (e.g., four feet) between the desk and the wall, the computer system can: highlight the desk, proximal a second location in the visualization layer, as a deviation from the known location of the wall; generate a second notification to investigate the desk in the second location in the agile work environment; generate a second prompt for the user to identify the desk as a deviation from the known location of the wall as present or absent within the space; and transmit the visualization of the space, the second notification, and the second prompt to the user. Then, responsive to the user's indication of presence of the desk deviating from the known location of the wall and presence of the desk deviating from the map (e.g., furniture layout), the computer system can reinforce the object deviation detection model.

Additionally or alternatively, the computer system can calculate an offset distance (e.g., two feet) between the desk and the wall and track this offset distance for a duration (e.g., one week). Then, in response to the offset distance (e.g., two feet) exceeding the minimum distance threshold (e.g., one foot) and in response to the duration (e.g., one week) exceeding a threshold duration (e.g., three days), the computer system can: highlight the desk, proximal a third location, in the visualization layer as a deviation from the known location of the wall; generate a third notification to investigate the desk in the third location in the agile work environment; generate a third prompt for the user to identify the desk deviating from the known location of the wall for the duration (e.g., one week) within the space; and transmit the visualization of the space, the third notification, and the third prompt to the user. Then, responsive to the user indicating presence of the desk deviating from the known location of the wall and presence of the desk deviating from the map (e.g., furniture layout), the computer system can reinforce the object deviation detection model.

Therefore, the computer system can leverage a threshold offset distance and a threshold duration to detect mutable objects deviating from known locations of target anchor objects, generate notifications of these mutable objects deviating from known locations of target anchor objects, and reinforce or update and/or retrain the object deviation detection model based on the user's indication of presence of absence of these mutable objects deviating from known locations of target anchor objects in the space.

11. Existing Digital Floor Plan+Graphical Representations

In one variation, the computer system can annotate the existing digital two-dimensional or three-dimensional floor plan of the space with graphical representations from a database and generate a two-dimensional or three-dimensional augmented map depicting furniture usage and furniture layout of the space.

More specifically, the computer system can: access a database of graphical representations of object types; extract graphical representations of furniture object types (e.g., chair, table, desk, etc.) from the database; match the graphical representations of furniture objects types to the corresponding object type label within the existing digital two-dimensional or three-dimensional furniture layout of the space; and overlay the existing two-dimensional or three-dimensional digital furniture layout of the space, annotated with graphical representations of furniture objects types, onto the existing digital two-dimensional or three-dimensional floor plan of the space; and generate an augmented visualization of furniture usage patterns of the space over a period of time (e.g., six hours, one day).

For example, the computer system can: define a database of template graphical representations (e.g., graphics, symbols, icons) associated with each object type; select a furniture object type graphical representation (e.g., a desk) from the database; arrange and locate the furniture object type graphical representation on top of all pixels labeled "desk" in the augmented two-dimensional floor plan; select a furniture object type graphical representation (e.g., a chair) from the database; arrange and locate the furniture object type graphical representation, on top of all pixels labeled "chair" in the augmented two-dimensional floor plan; and present the augmented two-dimensional floor plan to a user to reinforce and/or update the object detection models executed by the sensor blocks deployed in the space.

11.1 Absent Digital Floor Plan+Graphical Representations

In one variation, when an existing digital two-dimensional or three-dimensional floor plan is absent, the computer system can generate an augmented two-dimensional floor plan (or "map") of the space based on target installation locations and orientations of each sensor block deployed in the space and based on locations and orientations of objects detected by all sensor blocks deployed in the space. The computer system can then project graphical representations of object types onto the augmented two-dimensional floor plan.

For example, the computer system can implement methods and techniques described above to extract object types, orientations, and locations from the object lists—generated by the sensor blocks in the space—to populate an augmented two-dimensional floor plan of the space. The computer system can locate (or "project") graphical representations of each object type onto the augmented two-dimensional floor plan based on the locations and orientations of each object and the known locations of all sensor blocks deployed in the space. Then, the computer system can present the augmented two-dimensional floor plan to a user.

12. Augmented Three-Dimensional Map

Generally, the computer system is configured to aggregate non-optical data and images from sensor blocks deployed in the space, compile these non-optical data and images into locations, orientations, and types of objects in the space; generate a real-time visualization of the furniture layout and/or furniture usage of the space with graphical representations of these object types based on their locations and orientations; and present the real-time visualization to a user.

However, the computer system can additionally or alternatively implement similar methods and techniques to manage an augmented three-dimensional map of the space. The computer system can populate the augmented three-dimensional map of the space with graphical representations of object types based on their locations and orientations and present the augmented three-dimensional map to a user.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for detecting and visualizing objects within a space comprising:

during a first time period:

retrieving a map of the space annotated with known locations of target anchor objects and regions in the space, the map comprising:

a floor plan of the space annotated with known locations of target anchor objects and regions in the space; and a furniture layout of the space annotated with target quantities of mutable objects;

accessing a first set of images captured by a set of sensor blocks arranged within the space, the first set of images annotated with object types and locations of objects; and projecting the first set of images onto the map to form a visualization layer representing objects in the space based on known locations of the set of sensor blocks; and during a second time period:

isolating a target anchor object at a known location in a first region of the visualization layer;

detecting a first mutable object, in a set of mutable objects, at a first location in the first region;

calculating an offset distance between the target anchor object and the first mutable object, in the set of mutable objects, based on the first location and based on the known location; and in response to the offset distance exceeding a threshold offset distance:

highlighting the first mutable object in the visualization layer as a deviation; and generating a notification to investigate the first mutable object in the first region;

detecting a second set of mutable objects within a threshold distance of the known location of the target anchor object in the first region of the visualization layer;

characterizing a quantity of mutable objects in the first region; and in response to the quantity of mutable objects falling below a target quantity of mutable objects associated with the first region:

highlighting the second set of mutable objects, proximal a second location in the first region, as a second deviation from the target quantity of mutable objects;

generating a recommendation to increase the quantity of mutable objects to the target quantity of mutable objects in the second location; and transmitting the recommendation to a user.

2. The method of claim 1, further comprising during the second time period:

in response to the quantity of mutable objects exceeding the target quantity of mutable objects associated with the first region:

highlighting the second set of mutable objects, proximal a third location in the first region, as a third deviation from the target quantity of mutable objects;

generating a second recommendation to reduce the quantity of mutable objects to the target quantity of mutable objects in the third location; and transmitting the second recommendation to the user.

3. The method of claim 1:

further comprising, during a setup period preceding the first time period:

accessing a sequence of images captured by the set of sensor blocks;

for each image in the sequence of images:

extracting a set of features from the image;

detecting a set of objects based on the set of features;

deriving a location and an orientation of each object in the set of objects based on the set of features; and annotating the image with a timestamp and a unique identifier associated with a corresponding sensor block, in the set of sensor blocks;

deriving a first frequency of a first subset of objects, in the set of objects, present within the sequence of images; and in response to the first frequency of the first subset of objects exceeding a threshold frequency and in response to detecting presence of velocity of the first subset of objects:

identifying the first subset of objects as mutable objects; and deriving a mutable object detection model based on the first subset of objects; and wherein accessing the first set of images captured by the set of sensor blocks arranged within the space, comprises accessing the first set of images captured by the set of sensor blocks, the first set of images annotated with mutable objects and locations of mutable objects.

4. The method of claim 3:

further comprising, during the setup period:

deriving a second frequency of a second subset of objects, in the set of objects, present within the sequence of images; and in response to the second frequency of the second subset of objects exceeding the threshold frequency and in response to detecting absence of velocity of the second subset of objects:

identifying the second subset of objects as anchor objects; and deriving an anchor object detection model based on the second subset of objects;

wherein accessing the first set of images captured by the set of sensor blocks arranged within the space, comprises accessing the first set of images captured by the set of sensor blocks, the first set of images annotated with anchor objects and locations of anchor objects;

wherein isolating the target anchor object at the known location in the first region comprises detecting an initial anchor object at an initial location in the first region of the visualization layer based on the anchor object detection model; and wherein calculating the offset distance between the target anchor object and the first mutable object comprises calculating the offset distance between the initial target anchor object and the first mutable object based on the initial location and the first location.

5. The method of claim 1:

wherein isolating the target anchor object at the known location in the first region of the visualization layer comprises isolating the target anchor object, comprising a wall, at the known location in the first region comprising an agile work environment;

wherein detecting the first mutable object, in the set of mutable objects, at the first location in the first region comprises detecting a first desk, in a set of desks, at the first location in the agile work environment;

wherein calculating the offset distance between the target anchor object and the first mutable object comprises calculating the offset distance between the wall and the first desk, in the set of desks, based on the first location and the known location; and wherein generating the notification to investigate the first mutable object in the first region comprises generating a recommendation for the user to locate the desk within the threshold distance of the target anchor object.

6. The method of claim 1:

wherein detecting the first mutable object, in the set of mutable objects, at the first location in the first region comprises detecting the first mutable object, in the set of mutable objects, at the first location in the visualization layer, the first mutable object occupying the first location for a duration; and further comprising:

in response to the duration exceeding a threshold duration and in response to the offset distance exceeding the threshold distance:

highlighting the first mutable object at the first location in the visualization layer as the deviation from the known location of the target anchor object; and generating a notification to investigate the first mutable object in the first location.

7. The method of claim 1, further comprising, during the first time period:

accessing a first image, in the set of images, captured by a first optical sensor arranged within a first sensor block, in the set of sensor blocks, and facing an area-of-interest in the space;

detecting a first anchor object depicted in the first image;

isolating the first region of the map corresponding to the area-of-interest;

detecting the target anchor object, corresponding to the first anchor object in the first region of the map; and in response to detecting the target anchor object, corresponding to the first anchor object in the first region of the map, projecting the first image onto the map to form the visualization layer for the first region.

8. The method of claim 7:

wherein projecting the first image onto the map to form the visualization layer for the first region comprises in response to detecting the target anchor object, corresponding to the first anchor object in the first region of the map:

isolating a first edge of the first anchor object in the first image;

aligning the first edge of the first anchor object with a corresponding edge of the target anchor object in the first region of the map; and superimposing the first image onto the map to form the visualization layer of the first region.

9. The method of claim 1:

wherein accessing the first set of images captured by the set of sensor blocks arranged within the space comprises accessing the first set of images captured by the set of sensor blocks arrange within the space, the first set of images annotated with object types, orientations, and locations of objects;

further comprising, during a third time period between the first time period and the second time period:

accessing a second set of images captured by a set of sensor blocks arranged within the space, the second set of images annotated with object types, orientations, and locations of objects; and projecting the second set of images onto the map to form a second visualization layer of objects in the space based on known locations of the set of sensor blocks; and further comprising, during the second time period:

isolating the target anchor object at the known location in the first region of the second visualization layer;

detecting a second mutable object at a first orientation and within the threshold distance of the target anchor object in the first region of the visualization layer;

detecting the second mutable object at a second orientation and within the threshold distance of the target anchor object in the first region of the second visualization layer;

calculating an angular offset between the second mutable object in the first visualization layer and the second visualization layer based on the first orientation and the second orientation; and in response to the angular offset exceeding a threshold angular offset:

highlighting the second mutable object, proximal a second third location in the second visualization layer, as a second deviation from the first orientation in the visualization layer; and generating a second notification to investigate the second mutable object in the third location.

10. The method of claim 9, further comprising:

in response to the angular offset falling below the threshold angular offset:

isolating a subset of images, in the second set of images, within the first region of the second visualization layer;

calculating a target rotation angle for the subset of images, in the set of images, to reduce the angular offset between the first orientation and the second orientation of the second mutable object; and rotating the subset of images, in the second set of images, within the first region of the second visualization layer based on the target rotation angle.

11. The method of claim 9:

wherein isolating the target anchor object at the known location in the first region of the second visualization layer comprises isolating the target anchor object comprising a wall at the known location in the first region, representing a lounge area, of the second visualization layer;

wherein detecting the second mutable object at the first orientation comprises detecting the second mutable object comprising a couch at the first orientation and within the threshold distance of the wall in the lounge area of the visualization layer;

wherein detecting the second mutable object at the second orientation comprises detecting the couch at the second orientation and within the threshold distance of the wall in the lounge area in the second visualization layer;

wherein calculating the angular offset between the second mutable object in the first visualization layer and the second visualization layer comprises calculating the angular offset between the couch in the first visualization layer and the second visualization layer;

wherein highlighting the second mutable object in the second visualization layer as the deviation comprises highlighting the couch in the second visualization layer as a furniture layout deviation from the first orientation of the couch in the first visualization layer; and wherein generating the second notification to investigate the second mutable object in the first region comprises generating the second notification to investigate the couch in the lounge area.

12. The method of claim 9, further comprising, during a fourth time period:

receiving a first query from the user at a user portal defining a target time window and a target area-of-interest within the space to review;

detecting correspondence between the target area-of-interest and the first region in the map; and in response to the target time window intersecting the third time period and in response to detecting correspondence between the target area-of-interest and the first region in the map, presenting the second visualization layer in the user portal for review.

13. The method of claim 1:

further comprising, during a setup period preceding the first time period:

accessing an initial object list from a first sensor block, in the set of sensor blocks, the initial object list defining:

locations, object types, and orientations of objects detected in an initial set of images captured by the first sensor block during the setup time period; and an initial charge state of a battery arranged within the first sensor block; and further comprising, during the first time period:

accessing a first object list from the first sensor block, in the set of sensor blocks, the first object list defining:

locations, object types, and orientations of objects detected in a second set of images captured by the first sensor block during the first time period; and a first charge state of the battery arranged within the first sensor block; and in response to the first charge state of the battery exceeding the initial charge state of the battery:

detecting the first charge state of the battery as an initial deviation from the initial charge state of the battery; and generating a command for the first sensor block to capture a third set of images.

14. The method of claim 13:

wherein accessing the first set of images captured by the set of sensor blocks arranged within the space comprises accessing the third set of images captured by the first sensor block in the set of sensor blocks, the third set of images depicting the first region of the space; and wherein projecting the first set of images onto the map to form the visualization layer representing objects in the space comprises projecting the third set of images onto the map to form the visualization layer representing objects in the first region of the space based on a known location of the first sensor block.

15. A method for detecting and visualizing objects within a space comprising:

during a first time period:

retrieving a map of the space annotated with known locations of target anchor objects and target quantities of mutable objects;

accessing a first image captured by an optical sensor arranged within a sensor block and facing an area-of-interest in the space;

detecting a first anchor object depicted in the first image;

isolating a first region of the map corresponding to the area-of-interest;

detecting a target anchor object, corresponding to the first anchor object, in the first region of the map; and in response to detecting the target anchor object, corresponding to the first anchor object in the first region of the map, projecting the first image onto the map to form a visualization layer for the first region; and during a second time period:

detecting a first mutable object, in a set of mutable objects, at a first location in the visualization layer, the first mutable object occupying the first location for a duration;

calculating an offset distance between the first location of the first mutable object, in the set of mutable objects and a known location of the target anchor object;

in response to the duration exceeding a threshold deviation duration and in response to the offset distance exceeding a threshold deviation distance:

highlighting the first mutable object at the first location in the visualization layer as a deviation from the known location of the target anchor object; and generating a notification to investigate the first mutable object;

detecting a second set of mutable objects within a threshold distance of the known location of the target anchor object in the first region;

characterizing a quantity of mutable objects in the first region; and in response to the quantity of mutable objects falling below a target quantity of mutable objects associated with the first region:

highlighting the second set of mutable objects, proximal a second location, in the visualization layer;

generating a recommendation to increase the quantity of mutable objects to the target quantity of mutable objects in the second location; and transmitting the recommendation to a user.

16. The method of claim 15:

wherein detecting the first anchor object depicted in the first image comprises detecting the first anchor object comprising a floor in the first image;

further comprising, detecting a second anchor object comprising a wall abutting the floor depicted in the first image;

wherein detecting the target anchor object, corresponding to the first anchor object in the first region of the map comprises detecting the first target anchor object and the second target anchor object corresponding to the wall abutting the floor in the first region of the map; and wherein projecting the first image onto the map to form the visualization layer for the first region comprises in response to detecting the first target anchor object and the second target anchor object corresponding to the wall abutting the floor in the first region of the map:

aligning a first edge of the wall with a corresponding edge of the first target anchor object in the first region of the map;

aligning a second edge of the floor with a corresponding second edge of the second target anchor object in the first region of the map; and superimposing the first image onto the map to form the visualization layer of the first region.

17. The method of claim 15:

wherein isolating the first region of the map corresponding to the area-of-interest comprises isolating the first region of the map corresponding to the area-of-interest comprising an agile work environment;

wherein detecting the first anchor object depicted in the first image comprises detecting the first anchor object comprising a floor in the first image;

wherein detecting the first mutable object comprises detecting the first mutable object comprising a chair, in the set of mutable objects, at a first location in the visualization layer for the duration;

wherein calculating the offset distance comprises calculating the offset distance between the first location of the chair and a known location of the floor; and wherein highlighting the first mutable object in the visualization layer comprises highlighting the chair at the first location in the visualization layer as a furniture layout deviation from the known location of the floor.

18. A method for detecting and visualizing objects within a space comprising:

during a setup period:

accessing a sequence of images captured by a set of sensor blocks;

for each image in the sequence of images:

extracting a set of features from the image;

detecting a set of objects based on the set of features;

deriving a location and an orientation of each object in the set of objects based on the set of features; and annotating the image with a timestamp and a unique identifier associated with a corresponding sensor block, in the set of sensor blocks;

deriving a first frequency of a first subset of objects, in the set of objects, present within the sequence of images; and in response to the first frequency of the first subset of objects exceeding a threshold frequency and in response to detecting presence of velocity of the first subset of objects:

identifying the first subset of objects as mutable objects; and deriving a mutable object detection model based on the first subset of objects; and during a first time period succeeding the setup time period:

retrieving a map of the space annotated with known locations of target anchor objects and regions in the space;

accessing a first set of images captured by a set of sensor blocks arranged within the space, the first set of images annotated with mutable objects and locations of mutable objects; and projecting the first set of images onto the map to form a visualization layer representing objects in the space based on known locations of the set of sensor blocks; and during a second time period:

isolating a target anchor object at a known location in a first region of the visualization layer;

detecting a first mutable object, in a set of mutable objects, at a first location in the first region;

calculating an offset distance between the target anchor object and the first mutable object, in the set of mutable objects, based on the first location and based on the known location; and in response to the offset distance exceeding a threshold offset distance:

highlighting the first mutable object in the visualization layer as a deviation; and generating a notification to investigate the first mutable object in the first region.

\* \* \* \* \*